US006954433B2

United States Patent
Chikamatsu et al.

(10) Patent No.: US 6,954,433 B2
(45) Date of Patent: Oct. 11, 2005

(54) IP PROCESSOR

(75) Inventors: Yuichirou Chikamatsu, Kawasaki (JP); Yasuo Tezuka, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 861 days.

(21) Appl. No.: 09/792,195

(22) Filed: Feb. 22, 2001

(65) Prior Publication Data

US 2001/0053151 A1 Dec. 20, 2001

(30) Foreign Application Priority Data

Jun. 6, 2000 (JP) ........................................ 2000-169378

(51) Int. Cl.[7] ............................................. G01R 31/08
(52) U.S. Cl. .............. 370/237; 370/395.52; 370/395.54
(58) Field of Search ........................... 370/237, 395.54, 370/395.52, 395.1, 401, 412, 397, 235, 230, 231

(56) References Cited

U.S. PATENT DOCUMENTS

| | | | | | |
|---|---|---|---|---|---|
| 6,009,097 | A | * | 12/1999 | Han ....................... | 370/395.52 |
| 6,064,675 | A | * | 5/2000 | Alexander et al. ......... | 370/401 |
| 6,279,035 | B1 | * | 8/2001 | Brown et al. ............. | 709/224 |
| 6,327,242 | B1 | * | 12/2001 | Amicangioli et al. ....... | 370/216 |
| 6,389,446 | B1 | * | 5/2002 | Torii .................... | 718/100 |
| 6,421,321 | B1 | * | 7/2002 | Sakagawa et al. ......... | 370/238.1 |
| 6,452,921 | B1 | * | 9/2002 | Alexander et al. ......... | 370/351 |
| 6,635,542 | B2 | * | 10/2003 | Sleight et al. ............ | 438/311 |
| 6,822,963 | B1 | * | 11/2004 | Kavak ................... | 370/395.21 |

FOREIGN PATENT DOCUMENTS

| | | |
|---|---|---|
| JP | 9-8816 | 1/1997 |
| JP | 9-8817 | 1/1997 |
| WO | WO 99/21327 | * 4/1999 |

* cited by examiner

*Primary Examiner*—Ajit Patel
*Assistant Examiner*—Steven Blount
(74) *Attorney, Agent, or Firm*—Katten Muchin Rosenman LLP

(57) ABSTRACT

This invention relates to an IP processor, and more particularly, provides an IP processor that reduces network load when a plurality of IP processors connected to ATM switches are used in edge portion of an IP network. The IP processor is comprised of a line interface unit for interfacing with an ATM switch, an IP packet buffer unit for temporarily storing an IP packet from the line interface unit, and sending out the IP packet after address resolution to the line interface unit, and an IP address resolution unit that responds to address resolution request from the IP packet buffer unit and returns the destination address information after address resolution, wherein the IP packet buffer unit sends out, when destination address information cannot be retrieved from the IP address resolution unit, the temporarily stored IP packet to a transfer route for direct transfer between IP processors.

19 Claims, 31 Drawing Sheets

Fig.13

| RETRIEVED SOURCE | RETRIEVED INFORMATION | |
|---|---|---|
| DESTINATION IP ADDRESS | OUTPUT VP/VC | IP PROCESSOR NUMBER |

Fig.14

| RETRIEVED SOURCE | RETRIEVED INFORMATION |
|---|---|
| IP PROCESSOR NUMBER | DIRECT CONNECTION POSSIBLE/IMPOSSIBLE |

Fig.15

| RETRIEVED SOURCE | RETRIEVED INFORMATION |
|---|---|
| DESTINATION IP ADDRESS | DESTINATION IP ADDRESS IS/IS NOT UNDER OWN IP PROCESSOR |

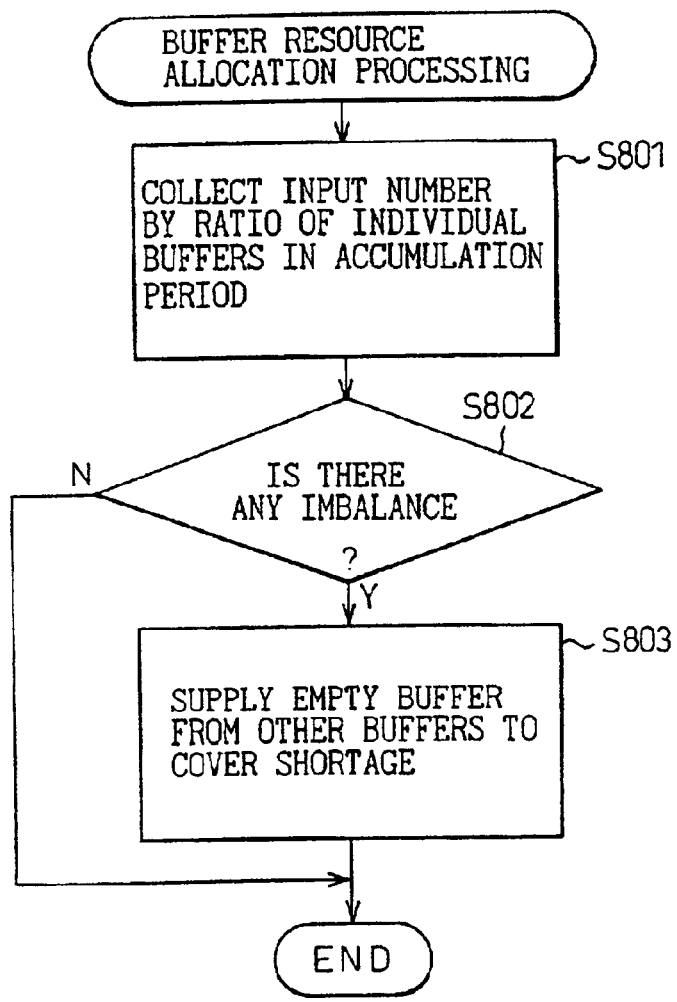

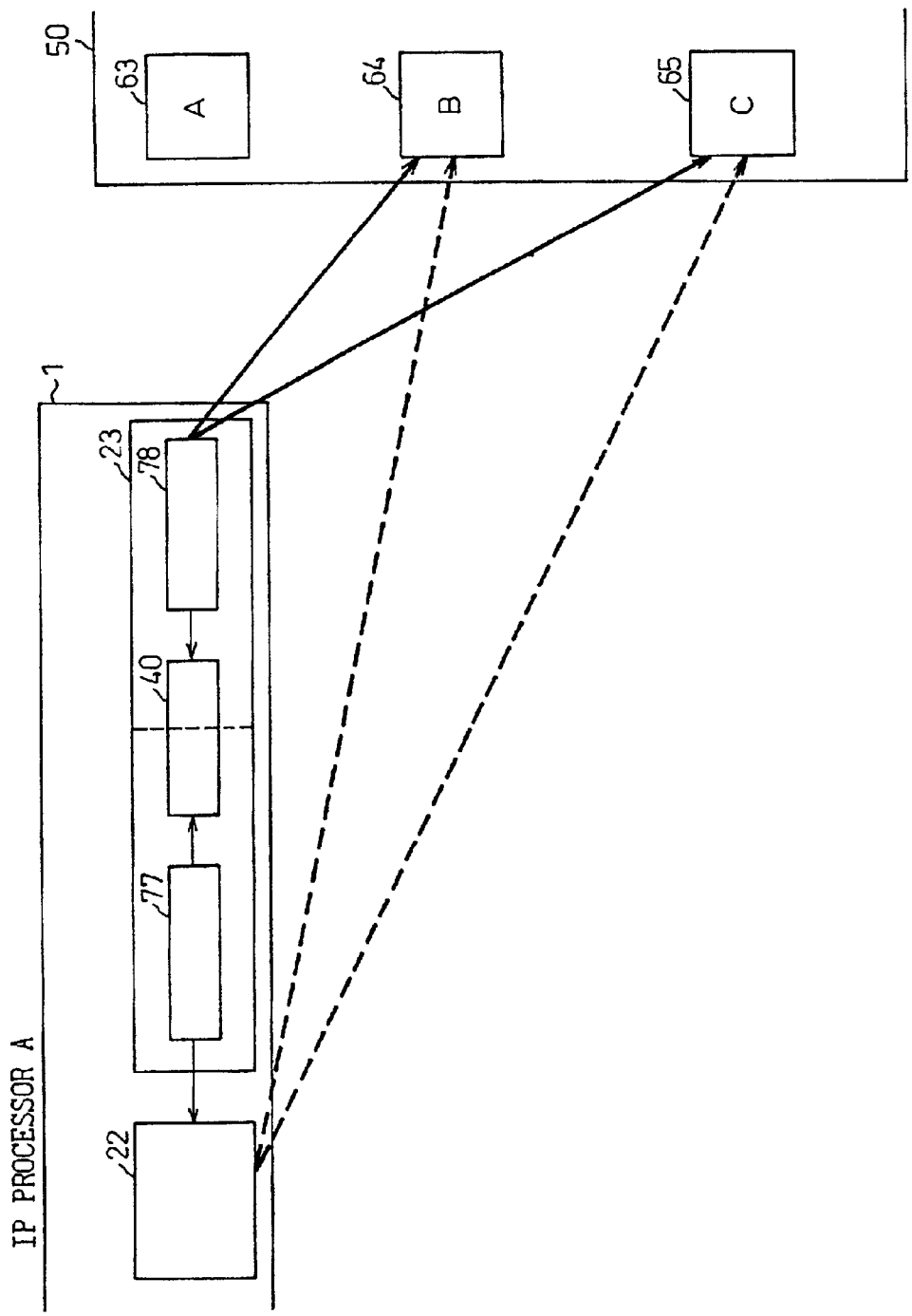

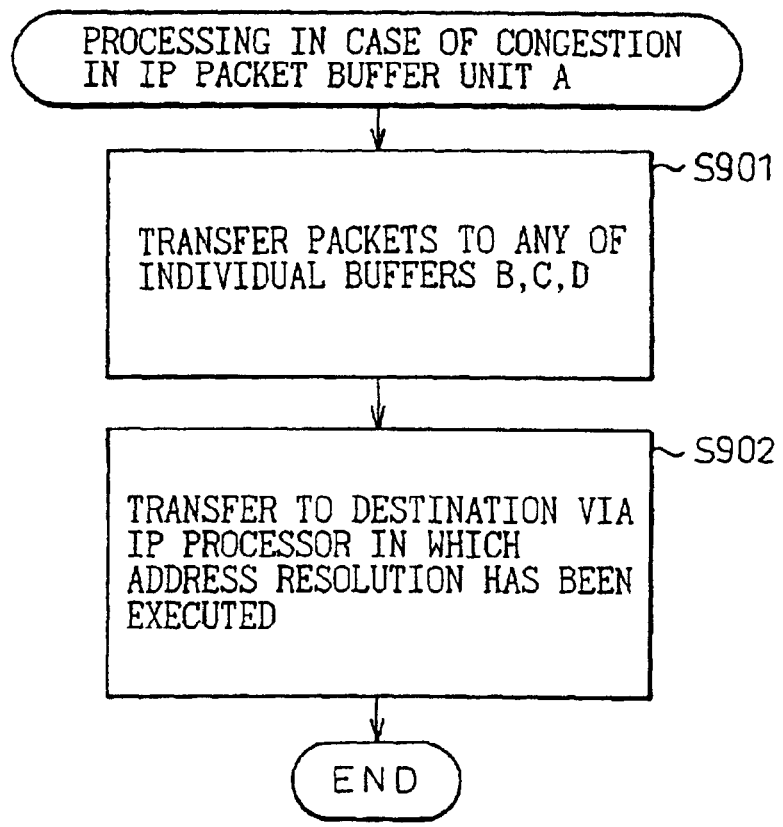

IP PROCESSOR

BACKGROUND OF THE INVENTION

1. Field of the Invention

The present invention relates to an IP (Internet Protocol) processor, and more particularly to an IP processor that is capable of reducing an increase in network load which may often arise in an IP network or ATM switches when a plurality of IP processors are provided at an edge portion of an IP network, due to frequent occurrence of address resolution protocol (ARP) or large volume data transfer in the IP network or the ATM switches to which these processors are connected.

2. Description of the Related Art

In recent years, it has been required for an IP network to transfer increasingly large volume of IP data at high speed, and several schemes have been proposed to use a large scale backbone to transfer large volume of data at high speed. Among them, the ATM network technology which permits high speed transfer of data has been widely introduced as a desirable backbone for this purpose.

In an ATM network, an IP processor is connected to an ATM switch, with a plurality of users connected to the ATM switch under its control. Thus, the IP processor receives an IP packet from a user under its control, executes IP address resolution protocol and transfers it to an IP packet network. The IP processor also receives an IP packet from the IP packet network, executes IP address resolution protocol and transfers it to the corresponding user under its control. The IP processor may also receive an IP packet from a user, execute IP address resolution protocol and transfer it to another IP processor having other users under its control.

FIG. 1 is a view showing an example of a conventional IP network.

In FIG. 1, a plurality of IP processors 1 to 4 are connected to the respective ATM switches 6 and 7, and the ATM switches 6 and 7 are in turn connected to an IP packet network 5 which is composed of routers and the like. Users 11 to 18 such as personal computers and workstations that are grouped under the control of each of the IP processors 1 to 4 are contained in the above-mentioned ATM switch 6 and 7. In the example shown, users 11, 12, users 13, 14, users 15, 16, and users 17, 18 are placed under the control of the IP processors 1, 2, 3, and 4, respectively.

Operation of the system as shown in FIG. 1 can be illustrated by considering a specific exemplary situation as follows. The IP processor 1 is connected to the ATM switch 6 located at the first floor in an office, and receives a large volume of packets from a user 12 under its control. The IP processor 1 transfers the packets, after executing address resolution protocol, through the ATM switch 6 and the IP packet network 5, to the IP processor 4 that is connected to the ATM switch 7 located at the second floor in the same office. The IP processor 4 transfers the packets, after executing address resolution protocol, to the user 18 under its control who is the destination of the packets.

In this case, however, if another user 14 connected to the ATM switch 6 at the first floor wishes to transfer an additional large volume of packets to the user 16 connected to the ATM switch 7 located at the second floor while the above-mentioned data are being transferred, local network load increases sharply at the interface portion between the IP packet network 5 and the ATM switches 6 and 7 as shown by dashed lines in FIG. 1. As a result, packet transfer capacity of the IP packet network 5 for the packets being transferred decreases sharply.

When large volume of data are simultaneously transferred locally at a specific point, the load on the ATM switch located at the edge portion of the interface to the backbone network increases sharply. In such a situation, high speed transfer of large volume of IP packets by the network as a whole becomes difficult, although ATM switches have inherently large capability for high speed transfer of data. The same problem can also arise from a required load of address resolution protocol that frequently happens in an IP network.

SUMMARY OF THE INVENTION

It is an object of the present invention, therefore, to overcome above-mentioned problems and to provide an IP processor and a method for interconnecting a plurality of IP processors that permit, when a plurality of IP processors are provided adjoining to each other, IP packets to be transferred directly from one IP processor to the other without being mediated by ATM switches or an IP packet network. With this construction, direct transfer of a large volume of packets between a plurality of IP processors can be realized so that local increase of load which arises frequently between an ATM switch and an IP packet network may be significantly reduced. Since execution of a direct address resolution protocol between the IP processors is possible with this construction, traffic volume mediated by IP network and the like can be greatly reduced. Consequently, high speed transfer of IP packets on the backbone side can be maintained as it should be. High speed transfer of a large volume of IP packets can also be achieved in the network as a whole.

According to the present invention, a plurality of IP processors contained in a ATM switch that is connected to an IP packet network are provided, each of said IP processors being comprised of a line interface unit that interfaces with the ATM switch, an IP packet buffer unit that temporarily stores an IP packet received from the line interface unit and sends the IP packet after address resolution to the line interface unit, and an IP address resolution unit that returns the destination address information after executing address resolution protocol in response to the address resolution request by the IP packet buffer unit, wherein said IP packet buffer unit further includes an inter-IP processor transfer unit that sends out the temporarily stored IP packet, when the destination address information from the IP address resolution unit is not retrievable, to a direct transfer route for transferring the IP packet between said IP processors without being mediated by the IP packet network or the ATM switch.

According to the present invention, the IP processor further includes a transfer buffer unit that accumulates the IP packets from said IP packet buffer unit, with its input being connected to said direct transfer route, and with its output being connected either to the input of the IP packet buffer unit of own IP processor, or to the input of the IP packet buffer unit and/or transfer buffer unit of said IP processor other than own IP processor.

According to the present invention, an IP packet accumulation server is provided for accumulating the IP packets from said IP packet buffer unit, with its input connected to said direct transfer route, and with its output connected to the input of said IP packet buffer unit, wherein said IP address resolution unit executes address resolution protocol for the IP packets accumulated in said IP packet accumulation server.

BRIEF DESCRIPTION OF THE DRAWINGS

The present invention will be more clearly understood from the description as set forth below with reference to the accompanying drawings.

FIG. 13 a view showing an example of the address table of FIG. 3;

FIG. 14 is a view showing an example of the IP processor table of FIG. 4;

FIG. 15 is a view showing an exemplary address table 41 of FIG. 11;

FIG. 31 is a view showing an exemplary control flow of FIG. 30;

FIG. 32 is a view showing a fourteenth embodiment of the present invention; and

FIG. 33 is a view showing an exemplary control flow of FIG. 32.

DESCRIPTION OF THE PREFERRED EMBODIMENTS

Figure 1:
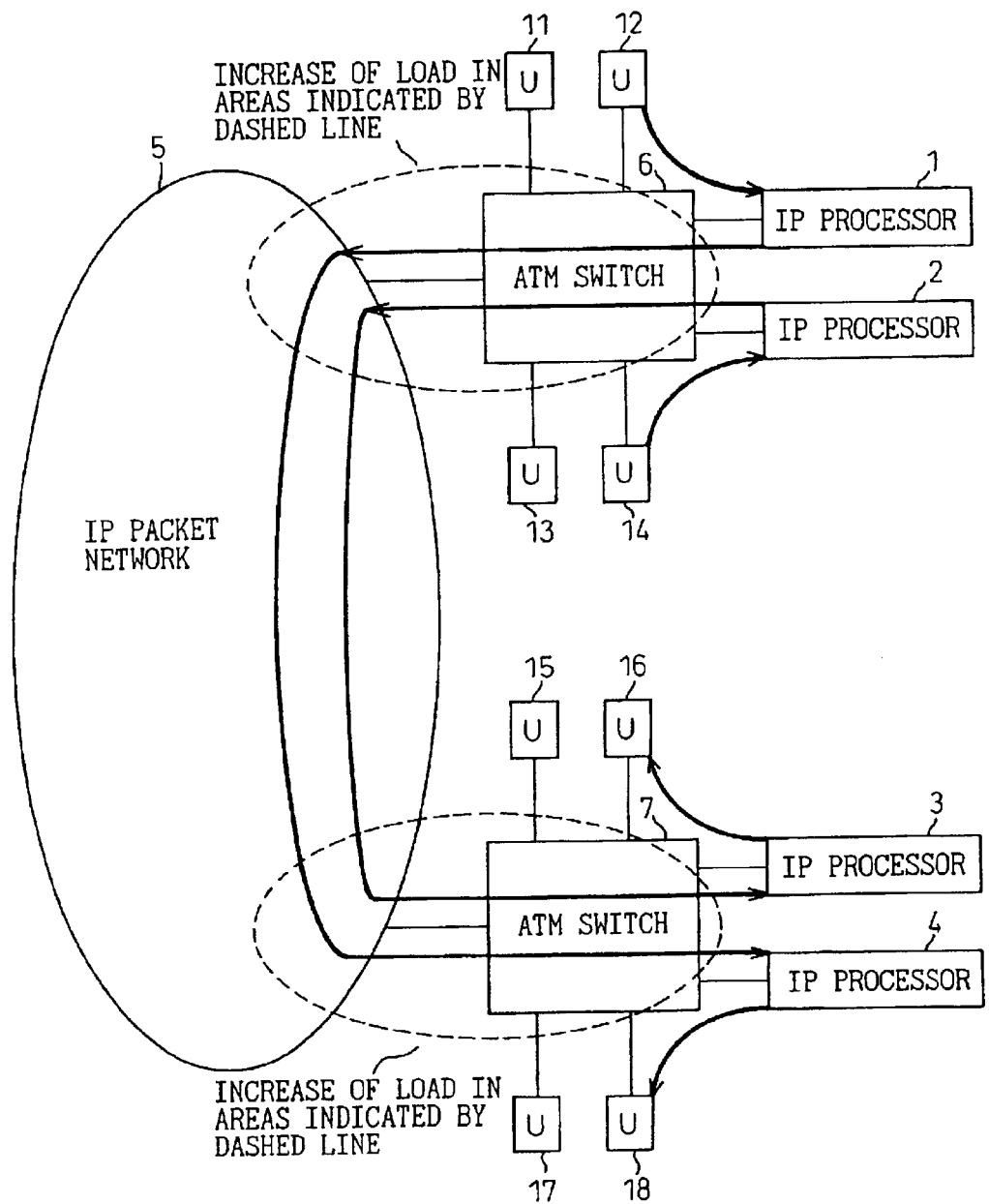
FIG. 1 is a view showing an example of a conventional IP network.
Figure 2:
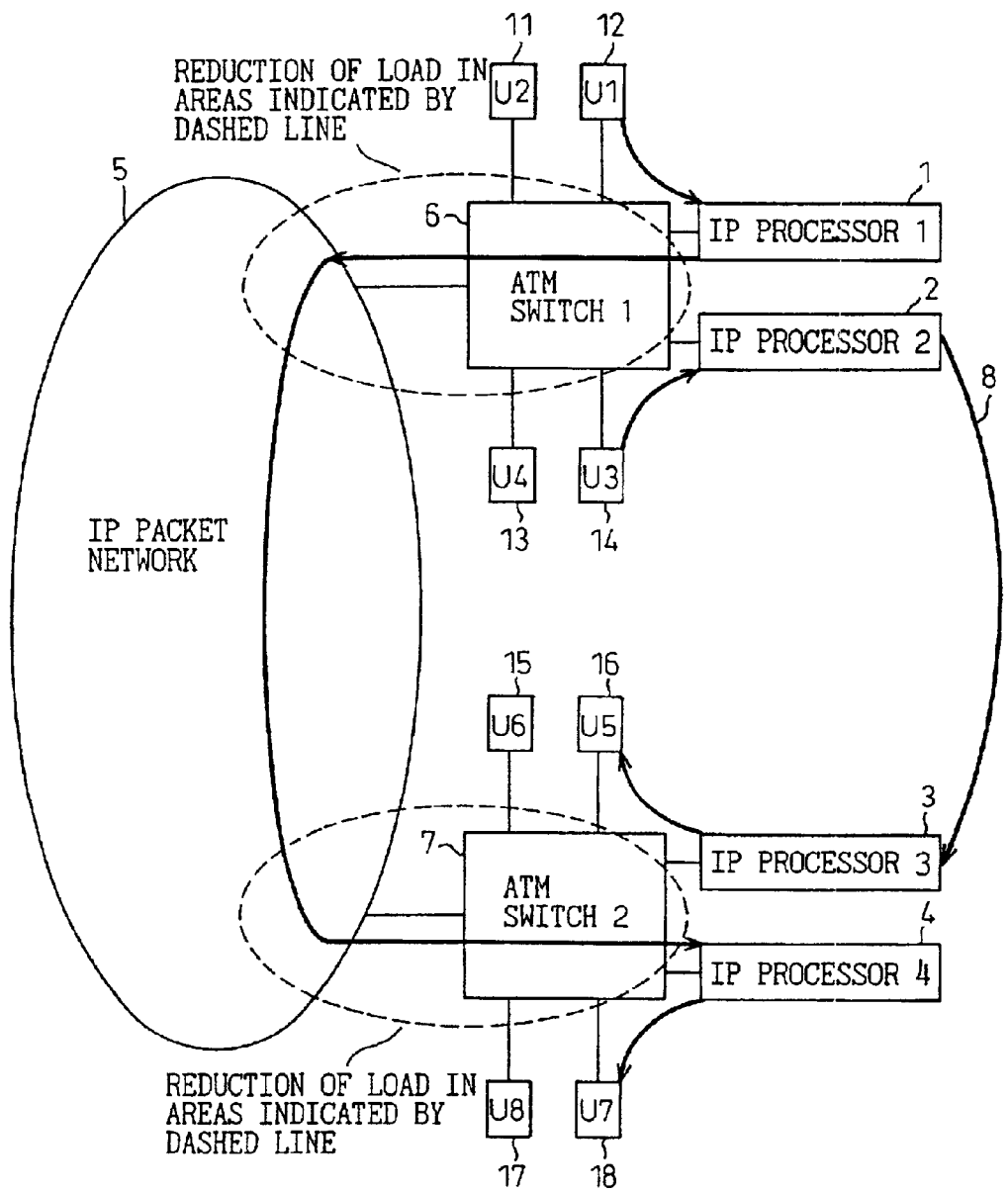
FIG. 2 is a view showing an exemplary construction of basic connection between a plurality of IP processors according to the present invention.

FIG. 2 is a view showing an exemplary construction of a basic connection between a plurality of IP processors according to the present invention. The same reference numerals as in FIG. 1 are used to denote like elements in this figure (and in subsequent figures).

In FIG. 2, the IP processor 1 connected to the ATM switch 6 receives a large volume of packets from a user 12 under its control. The IP processor 1 transfers the packets, after executing address resolution protocol, via the ATM switch 6 and the IP packet network 5, to the IP processor 4 that is connected to the ATM switch 7. The IP processor 4 transfers the packets, after executing address resolution protocol, to the user 18, under its control, who is the destination of the packets. Construction, so far, is identical to the conventional construction shown in FIG. 1.

Construction of the IP processors 1 to 4 according to the present invention, however, differs in that, in addition to the conventional packet transfer route via the above described IP network 5, it comprises another route 8 which is not mediated by said IP packet network 5, but connects the IP processors to each other directly or via a server or the like. In the example shown in FIG. 2, if another user 14 that is connected to the ATM switch 6 wishes to transfer an additional large volume of packets to the user 16 connected to the ATM switch 7 while the above-mentioned data are being transferred, the IP processor 2 that has executed address resolution protocol transfers the large volume of packets, referring to a table or the like in its possession, directly via said another route 8 to the IP processor 3 that has the destination user 16 under its control. The IP processor 3 executes address resolution protocol for the received packets and transfers them to the user 16.

By thus providing another route 8 that connects the plurality of adjoining IP processors 1 to 4 to each other directly or via a server or the like, it becomes possible to significantly reduce the above described problem (influence of the increase of local load in the edge portion to the backbone network) that may still arise in the communication with other IP processors (not shown) separately connected to the IP packet network 5. As a result, a capability of high speed transfer of the network as a whole can be realized and maintained.

Figure 3:
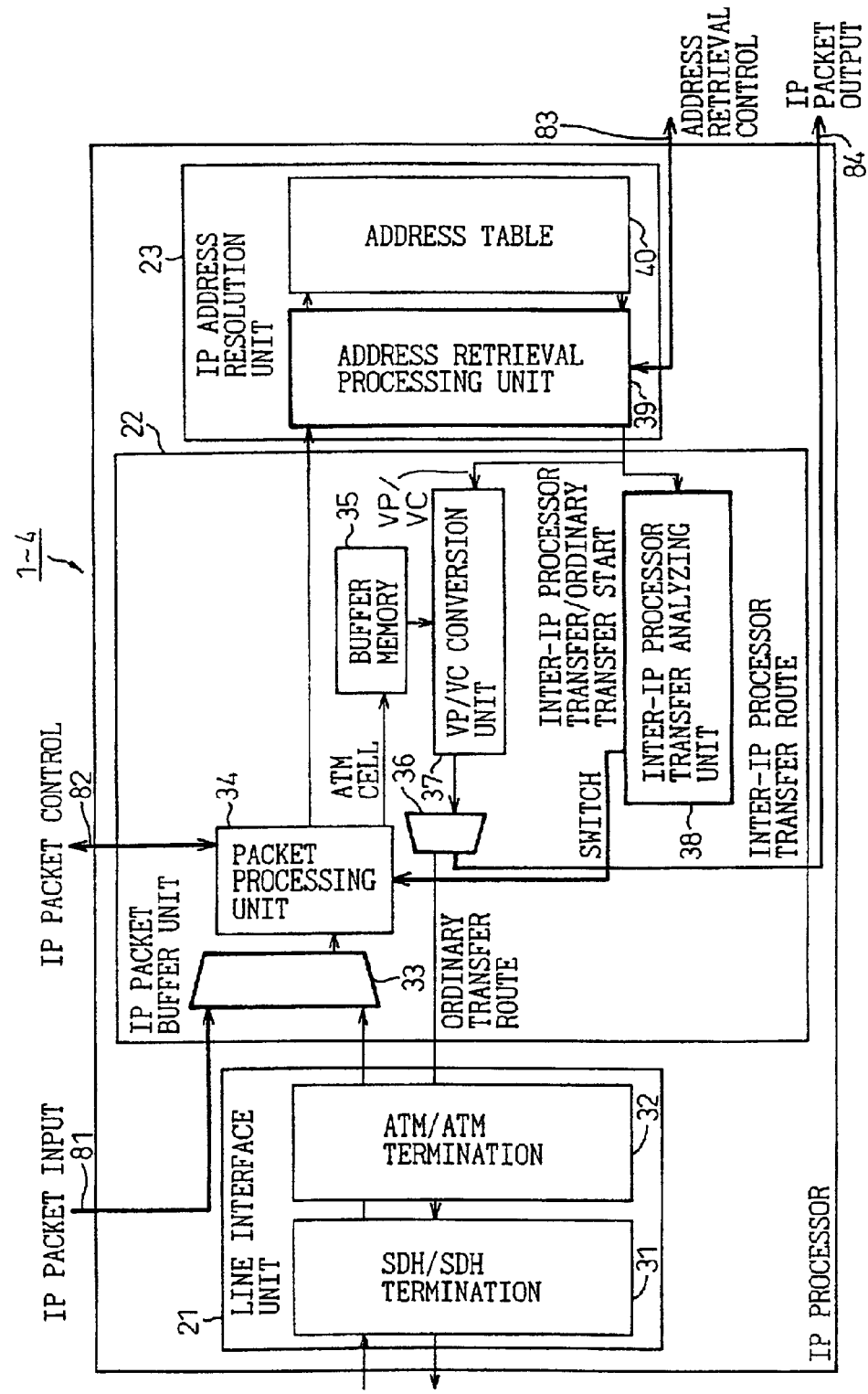
FIG. 3 is a view showing an example of basic construction of an IP processor according to the present invention.

FIG. 3 is a view showing an example of the basic construction of an IP processor according to the present invention for executing the above-mentioned processing.

First, operation of the IP processor will be briefly described. A line interface unit 21 connected to an ATM switch 6 or 7, executes signal transformation from the SDH layer to the ATM layer and conversely, using SDH/SDH termination unit 31 and ATM/ATM termination unit 32. The IP packet buffer unit 22 accumulates the ATM cell that has been transformed from the SDH layer to the ATM layer by the line interface unit 21, in internal buffer or the like by each IP packet in the form of an ATM cell using header information of the AAL5 type or the like, and sends a destination address resolution request with a destination IP address to an IP address resolution unit 23.

The IP address resolution unit 23 executes the destination address resolution, using the destination IP address that has been received by an address retrieval processing unit 34 as a key and referring to an address table 40 that is stored in its own memory. The destination address information obtained in this way is returned to the IP packet buffer unit 22. The IP packet buffer unit 22 modifies the header information of the ATM cell accumulated by IP packet into said received destination address information, and sends it to the line interface unit 21. The line interface unit 21 sends out the signal that has been transformed from ATM layer to SDH layer to the ATM switch 6 or 7.

Above described operation is the same as in the conventional IP processor. Next, the operation of the IP packet buffer unit 22 executing functions characteristic of the present invention will be described in more detail.

A selector 33 selects either above described ATM signal that is input from the line interface unit 21 or IP packet input 81 that is received from outside in the form of an ATM signal as explained in embodiments described later, and outputs it to a packet processing unit 34. The packet processing unit accumulates it in a buffer memory 35, by IP packet, in the form of an ATM cell, and upon completion of the packet, sends an IP address resolution request with a destination IP address to the IP address resolution unit 23.

When, as a result of the address resolution by the IP address resolution unit 23, a destination VP/VC channel and a destination IP processor number are returned, a VP/VC conversion unit 37 sets the received destination VP/VC as the destination address for conversion. An inter-IP processor transfer analyzing unit 38 that stores in its own memory an IP processor table showing the number of IP processors which permit direct transfer of IP packets between them, compares the IP processor table with the received number of destination IP processor, and sends, when applicable, an inter-IP processor transfer start request to the packet processing unit 34. When no applicable IP processor number is found, it sends an ordinary transfer start request to the packet processing unit 34.

The packet processing unit 34, after switching the output of a switch 36, according to the received request which is an inter-IP processor transfer start request or an ordinary transfer start request, to an IP packet output 84 in the former case or to the line interface unit 21 in the latter case, sends out the IP packets accumulated in the buffer 35 to the VP/VC conversion unit 37. The VC/VP conversion unit 37 modifies the address of the received ATM cell to said destination VP/VC, and the switch 36 sends it to above-mentioned selected port (21 or 84).

An IP packet control signal 82 that can control transfer/output or the like of IP packets to the external equipment is given to the packet processing unit 34 of the IP packet buffer unit 22, and an address retrieval control signal 83 is given to an address retrieval processing unit 39 of the IP address resolution unit 23. Functions and operations of these signals will be described later with reference to subsequent embodiments.

Thus, with the construction according to the present invention, in addition to the conventional packet transfer via an IP network, direct packet transfer between IP processors that is not mediated by ATM switches or an IP packet network has been made possible by the inter-IP processor transfer analyzing unit 38 and the switch 36 and the like of the IP packet buffer unit 22.

Figure 4:
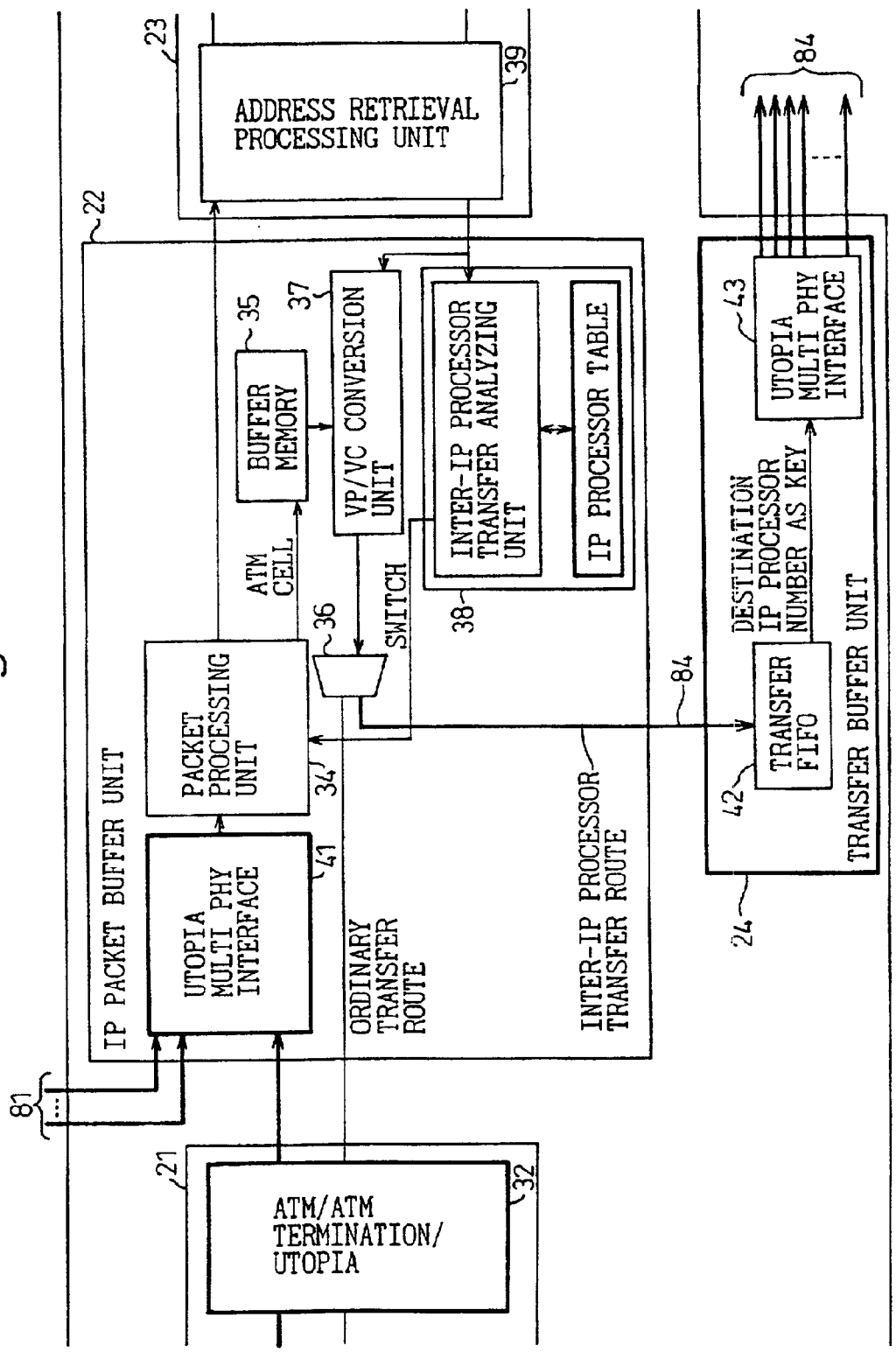
FIG. 4 is a view showing a first embodiment of the present invention.

FIG. 4 is a view showing a first embodiment of the present invention. The portion of the construction that is characteristic of the present embodiment is shown by thick solid line (as in subsequent figures showing other embodiments).

In FIG. 4, the UTOPIA MULTI PHY (PHYSICAL) interface 41 of the IP packet buffer unit 22 is an optical bus that permits ATM connection of 1:32. Here, instead of the selector 33 in FIG. 3, an ATM signal is input based on the UTOPIA MULTI PHY interface from the line interface unit 21 and IP packet input 81 from external equipments. Thus, a UTOPIA interface is added to the output stage 32 of the line interface unit 21. Same ATM cell signal as in FIG. 3 is output from the UTOPIA MULTI PHY interface 41.

Subsequent processing in the IP packet buffer unit 22 is the same as in FIG. 3. The inter-IP processor transfer analyzing unit 38 is shown together with its IP processor table. An example of the address table 40 of the IP address resolution unit 23 is shown in FIG. 13, and an example of the above-mentioned IP processor table of the inter-IP processor transfer analyzing unit 38 is shown in FIG. 14.

As described before, when the IP packet buffer unit 22 sends the destination address resolution request to the IP address resolution unit 23 together with the destination IP address, the IP address resolution unit 23 obtains an output VP/VC and the number of the IP processor corresponding to the received destination IP address from the address table of FIG. 13, and returns them to the IP packet buffer 22. The inter-IP processor transfer analyzing unit 38, upon confirmation that the received number of IP processor can be found in the IP processing table of FIG. 14, sends an inter-IP processor transfer start request on an ordinary transfer start request based on the corresponding set value of direct connection possible/impossible, to the packet processing unit 34.

In the present embodiment, when the inter-IP processor transfer start request is received, the packet processing unit 34 switches the output of the switch 36 to a transfer buffer unit 24. As a result, the IP packet from the buffer memory 35, after being converted to a new VP/VC in the VP/VC conversion unit 37, is temporarily stored to a transfer FIFO unit 42. The transfer FIFO unit 42 sends said temporarily stored IP packet, based on the number of the destination IP processor of the received IP packet, to the IP packet output 84 to be connected to the corresponding IP processor. In the present embodiment, the UTOPIA MULTI PHY interface 43 having the same construction as above-mentioned UTOPIA MULTI PHY interface 41 is used as an interface with external equipments. Outputs of the IP packet output 84 are connected to the IP packet inputs 81 of the other adjoining IP processors, respectively.

Figure 5:
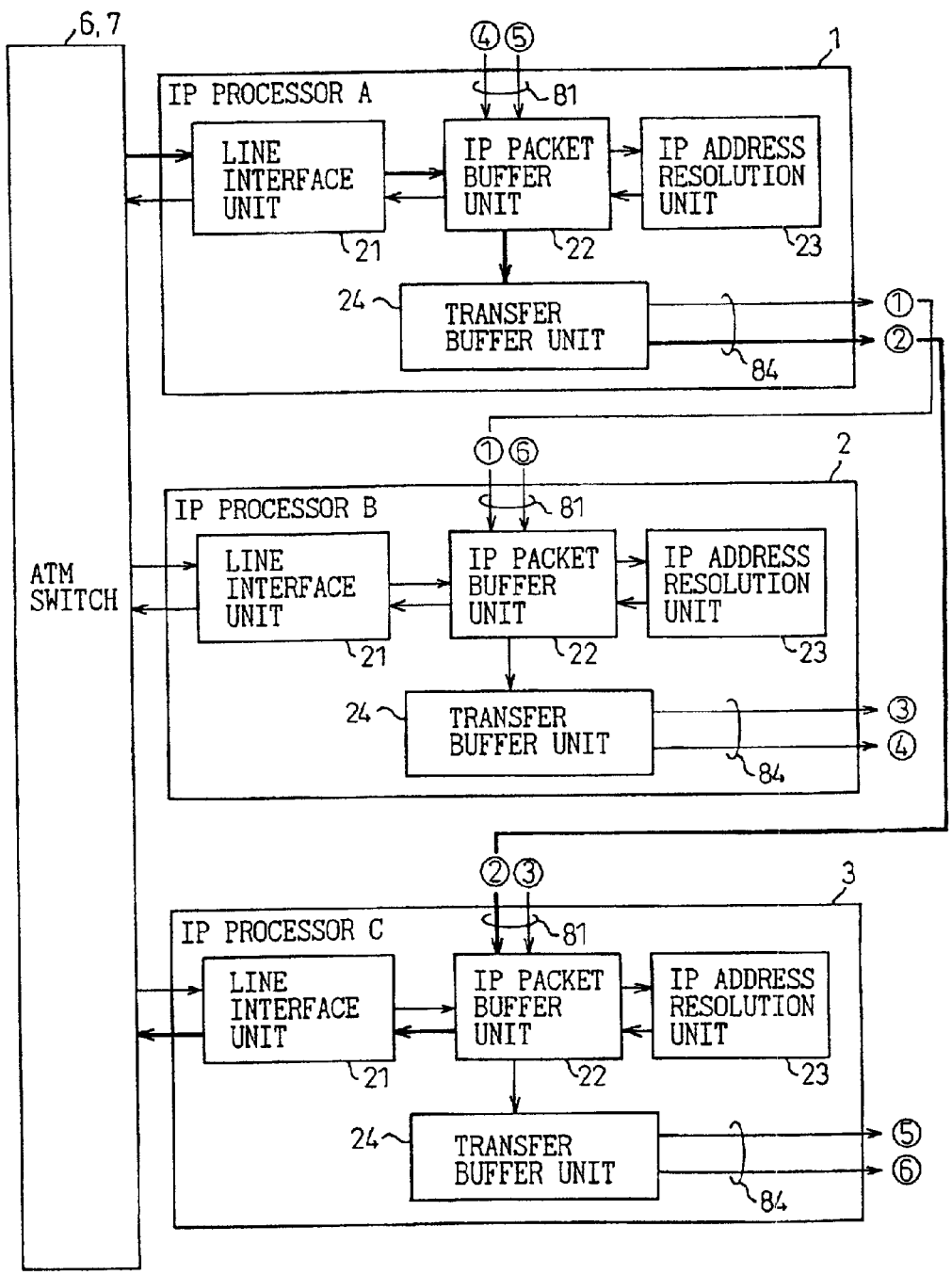
FIG. 5 is a view useful for explaining the operation of the first embodiment.
Figure 6:
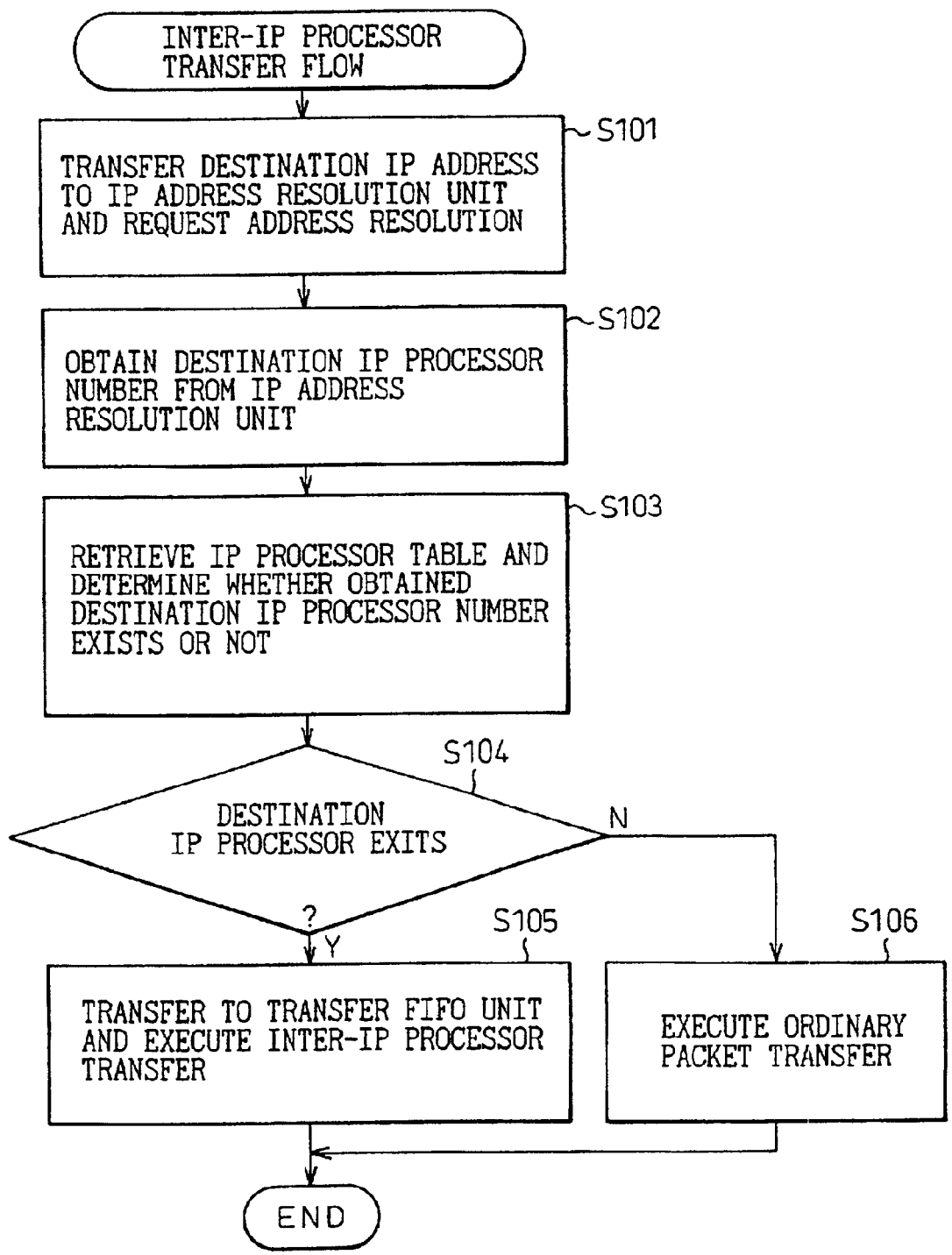
FIG. 6 is a view showing an exemplary control flow of FIG. 5.

FIG. 5 is a view useful for explaining the operation of the first embodiment. FIG. 6 is a view showing an exemplary control flow of an IP processor.

In FIG. 5, when the IP processor 1 receives an IP packet from a terminal (not shown) via ATM switches 6, 7, the IP packet is stored to the IP packet buffer unit 22 via the line interface unit 21. Then, the IP packet buffer unit 22 sends the destination address to the IP address resolution unit 23 and requests address resolution (S101).

When the output VP/VC and the number of the IP processor (in this example, the number of the IP processor 3) are sent from the IP address resolution unit 23(S102), the IP packet buffer unit 22 confirms the existence of the IP processor 3(S104), and sends out the IP packet after VP/VC conversion to the transfer buffer unit 24(S105). The transfer buffer unit 24 directly transfers the stored IP packet destined to the IP processor 3 via the UTOPIA MULTI PHY interface to the IP processor 3. Upon reception of the IP packet, the IP processor 3 executes address resolution of the terminal under its control and sends the received IP packet to the ATM switches 6, 7.

The numbers ① to ⑥ in the figure indicate that the IP packet input and output 81, 84 of the same number are connected via the UTOPIA MULTI PHY interface. Each of the IP processors can be connected via the UTOPIA MULTI PHY interface to all the IP processors that are registered in the IP processor table as available for direct transfer. The UTOPIA MULTI PHY interface adjusts the competition of the IP packet input/output using handshake, and transmits the IP packet to the destination utilizing empty timing of the packet transfer.

Figure 7:
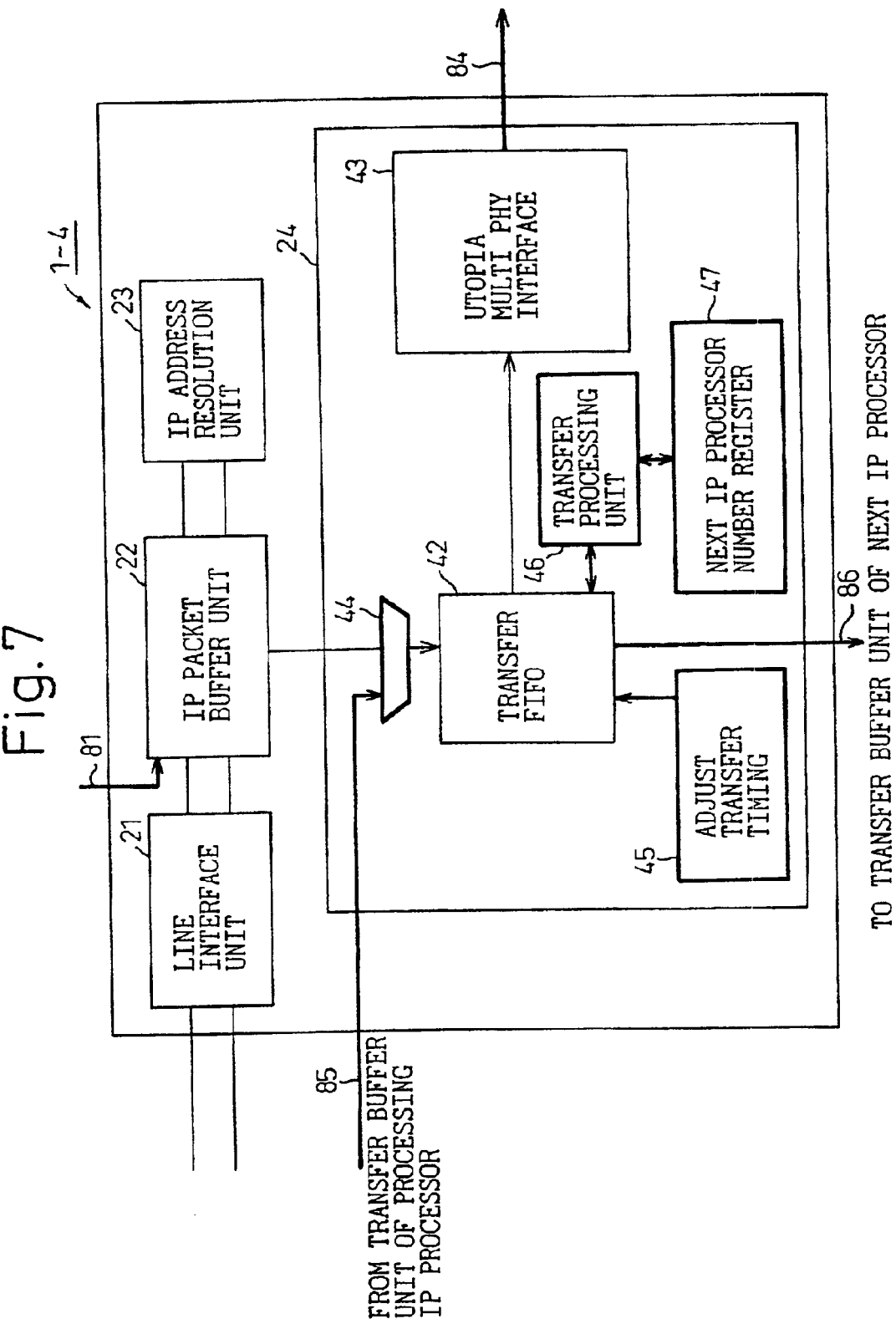
FIG. 7 is a view showing a second embodiment of the present invention.

FIG. 7 is a view showing a second embodiment of the present invention.

In this embodiment, the transfer buffer unit 24 is connected successively to the IP packet buffer unit 22 and the transfer buffer unit 24 of the next adjoining IP processor. Thus, each of the IP processors is connected only to the next adjoining IP processor. As shown in FIG. 7, a transfer processing unit 46 is newly provided in the transfer buffer unit 24, and a next IP processor number register 47 for storing the number of the next IP processor is also provided. In order to execute its own IP packet transfer between its transfer FIFO unit 42 and the transfer FIFO unit 42 of the next IP processor without the mediation of UTOPIA MULTI PHY interface of the first embodiment, a selector 44 is provided on the input side of a transfer timing adjusting unit 45 and the transfer FIFO unit 42.

Upon confirmation of the IP packet reception by the transfer FIFO unit, the transfer processing unit 46 determines whether the number of the IP processor of the received IP packet is same as the number of the IP processor stored in the next IP processor number register 47 or not. If the two numbers coincide, the IP packet is sent as in the first embodiment from the IP packet output 84 via the UTOPIA MULTI PHY interface 43 to the IP packet input 81 of the IP packet buffer unit 22 of the next IP processor. On the contrary, if the two numbers do not coincide, the IP packet in the transfer FIFO unit 42 is sent under the control of the transfer timing adjusting unit 45 to the side of line 86, and the next IP processor stores it from the line 85 directly to the transfer FIFO unit 42.

Figure 8:
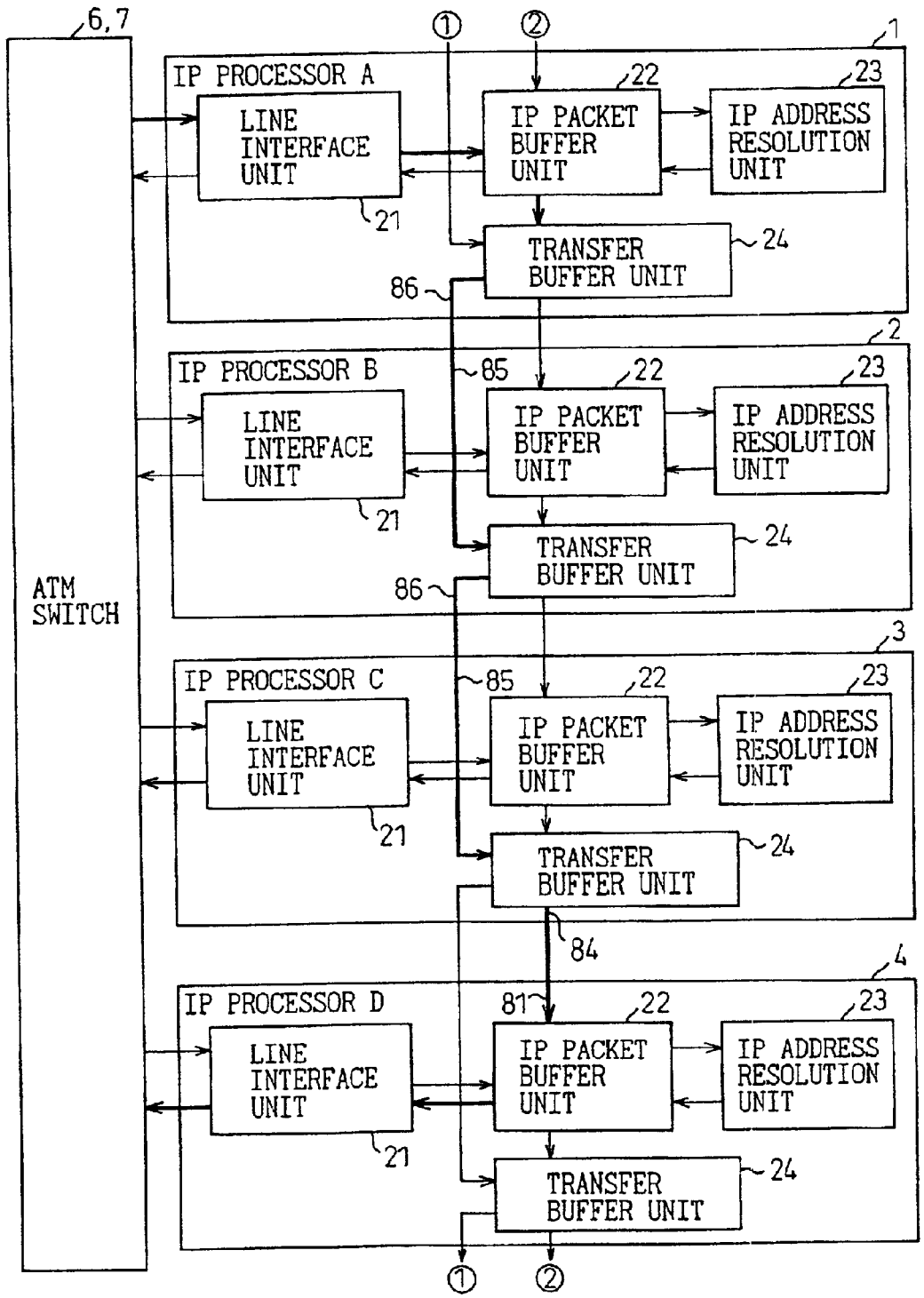
FIG. 8 is a view useful for explaining the operation of the second embodiment.

FIG. 8 is a view useful for explaining the operation of the second embodiment.

In FIG. 8, when the IP processor 1 receives an IP packet via the ATM switch 6 or 7 from a terminal (not shown), the IP packet is stored via the line interface unit 21 to the IP packet buffer unit 22. Then, the IP packet buffer unit 22 sends the destination address to the IP address resolution unit 23 and requests address resolution.

When the output VP/VC and the number of the IP processor (in this example, the number of the IP processor 4) are sent from the IP address resolution unit 23, the IP packet buffer unit 22 confirms the existence of the IP processor 4, and sends the IP packet that has been subjected to VP/VC conversion, to the transfer buffer unit 24. Processing is so far identical with that in the first embodiment. Then, the transfer buffer unit 24 determines the coincidence of the received number of the IP processor with the stored number of next IP processor (in this example, the number of the IP processor 2). Since in this example the two numbers do not coincide, the transfer buffer unit 24 sends out the IP packet directly to the transfer buffer unit 24 of the next IP processor 2.

The transfer buffer unit 24 of the next IP processor 2 determines that the received number of the IP processor 4 does not coincide with the stored number of the next IP processor 3, and sends out the IP packet directly to the transfer buffer unit 24 of the next IP processor 3. The transfer buffer unit 24 of the IP processor 3 determines that the received number of the IP processor 4 coincides with the stored number of the next IP processor 4, and sends the IP packet via the UTOPIA MULTI PHY interface to the IP packet buffer unit 22 of the IP processor 4. The IP processor 4 that receives the IP packet executes address resolution of the terminal under its control, and sends out the received IP packet to the ATM switch 6 or 7.

In the figure, the numbers ① and ② of the IP processor 1 are connected to the numbers ① and ② of the IP processor 4, respectively. In the present embodiment, the transfer buffer unit 24 determines the IP packet to be relayed by it, and in the case of such a relay, it transfer the IP packet directly to the transfer buffer unit 24 of the next IP processor. Thus, no address resolution protocol to be executed by the IP packet buffer unit 22 arises, and connection needs to be made only with the next IP processor, so that simple and high speed communication between IP processors can be realized.

Figure 9:
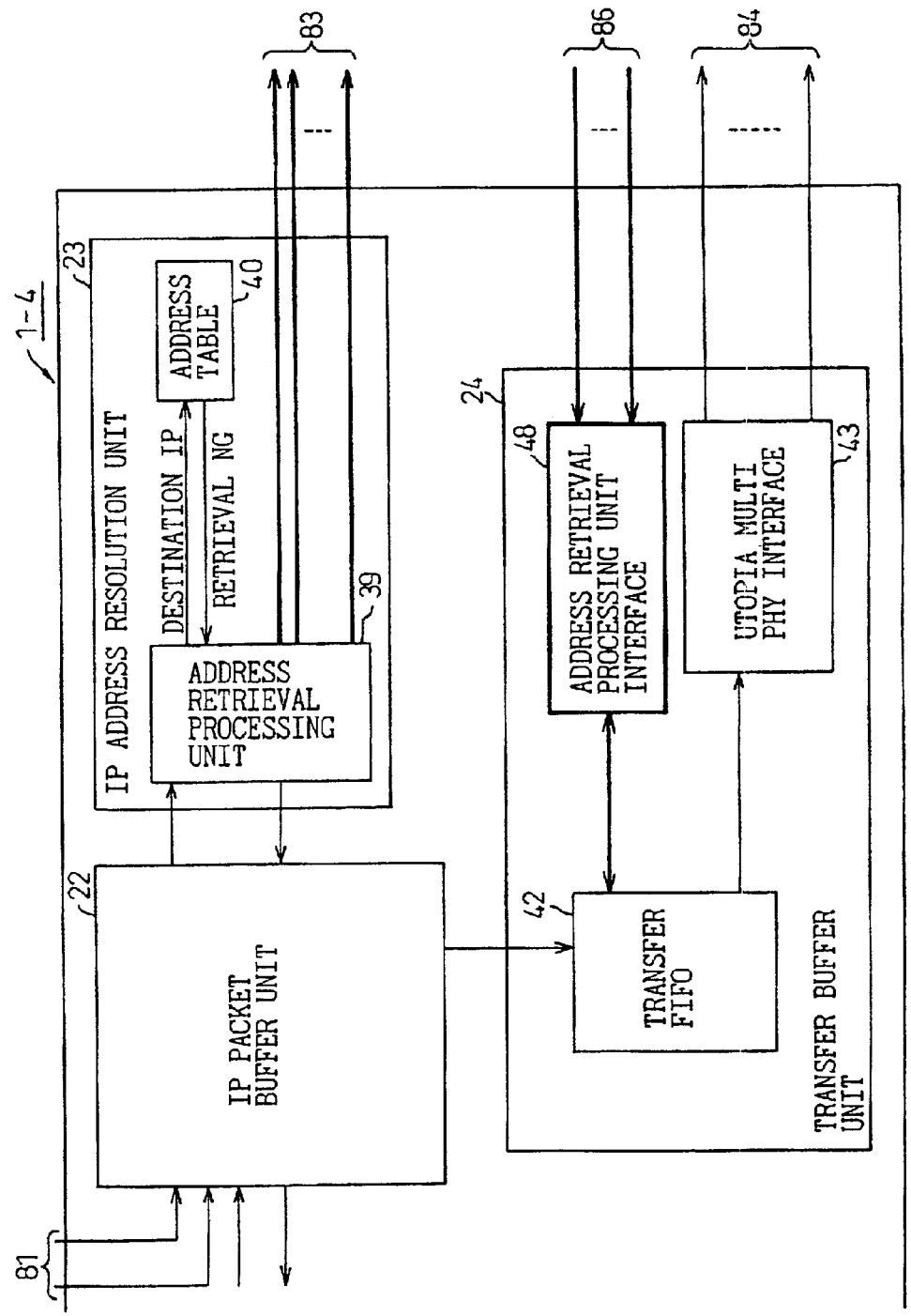
FIG. 9 is a view showing a third embodiment of the present invention.

FIG. 9 is a view showing a third embodiment of the present invention.

In this embodiment, even if an IP processor fails in the execution of an address resolution protocol, the IP packet can be transferred directly to the other adjoining IP processor so that the other IP processor can execute the address resolution protocol, and transfer the IP packet after the address resolution. With this construction, the address information to be stored by each IP processor can be significantly reduced and distributed. As a result, increase of traffic volume due to address resolution protocol and consequent decrease of the communication speed can be avoided.

As shown in FIG. 9, when the IP packet buffer unit 22 sends an address resolution request with a destination IP address to the IP address resolution unit 23, an address retrieval processing unit 39 of the IP address resolution unit 23 retrieves the address table 40. In this example, the address cannot be retrieved and a retrieval NG is returned to the IP packet buffer unit 22. As a result, NO CONVERSION (THROUGH) is set to the VP/VC conversion unit 37 of the IP packet buffer 22. Upon reception of the retrieval NG, the inter-IP processor transfer analyzing unit 38 sends an inter-IP processor transfer start request to the packet processing unit 34. On the other hand, if the retrieved result has been returned normally, an ordinary transfer start request is sent to the packet processing unit 34.

Upon reception of the inter-IP processor transfer start request due to the retrieval NG, the packet processing unit 34 switches the switch 36 to the transfer buffer unit 24 and outputs the IP packet in the buffer memory 35. In this case, the IP packet is transferred to the transfer buffer unit 24 as it is without being subjected to the header conversion in the VP/VC conversion unit 37. The packet processing unit 34 requests, utilizing empty time in processing or the like, address retrieval of the packet with unresolved address in the directly transferrable IP processor stored in the IP processor table of the inter-IP processor transfer analyzing unit 38.

The address retrieval processing unit 39 of the IP address resolution unit 23 is connected via line 83 and line 86 to an address retrieval processing unit interface 48 of the transfer buffer unit 42 of all other adjoining IP processors, and retrieves the IP packet existing in the transfer FIFO unit 42 of other IP processor via the address retrieval processing unit interface 48. When the destination address of the IP packet can be resolved by the retrieving IP processor, it instructs transfer of the IP packet to own IP processor via the address retrieval processing unit interface 48.

Then, the IP packet in the transfer buffer unit is transferred via UTOPIA MULTI PHY interface 43 and through line 84, 81 to the IP packet buffer unit 22 of the retrieving IP processor. The IP packet is sent out, after address resolution in the retrieving IP processor, to the IP packet network. Alternatively, the present invention may be constructed such that the IP address resolution unit 23 of the IP processor successively accesses to the transfer buffer unit 24 of other IP processor, and instructs transfer of an IP packet when address resolution of the IP packet can be executed.

Figure 10:
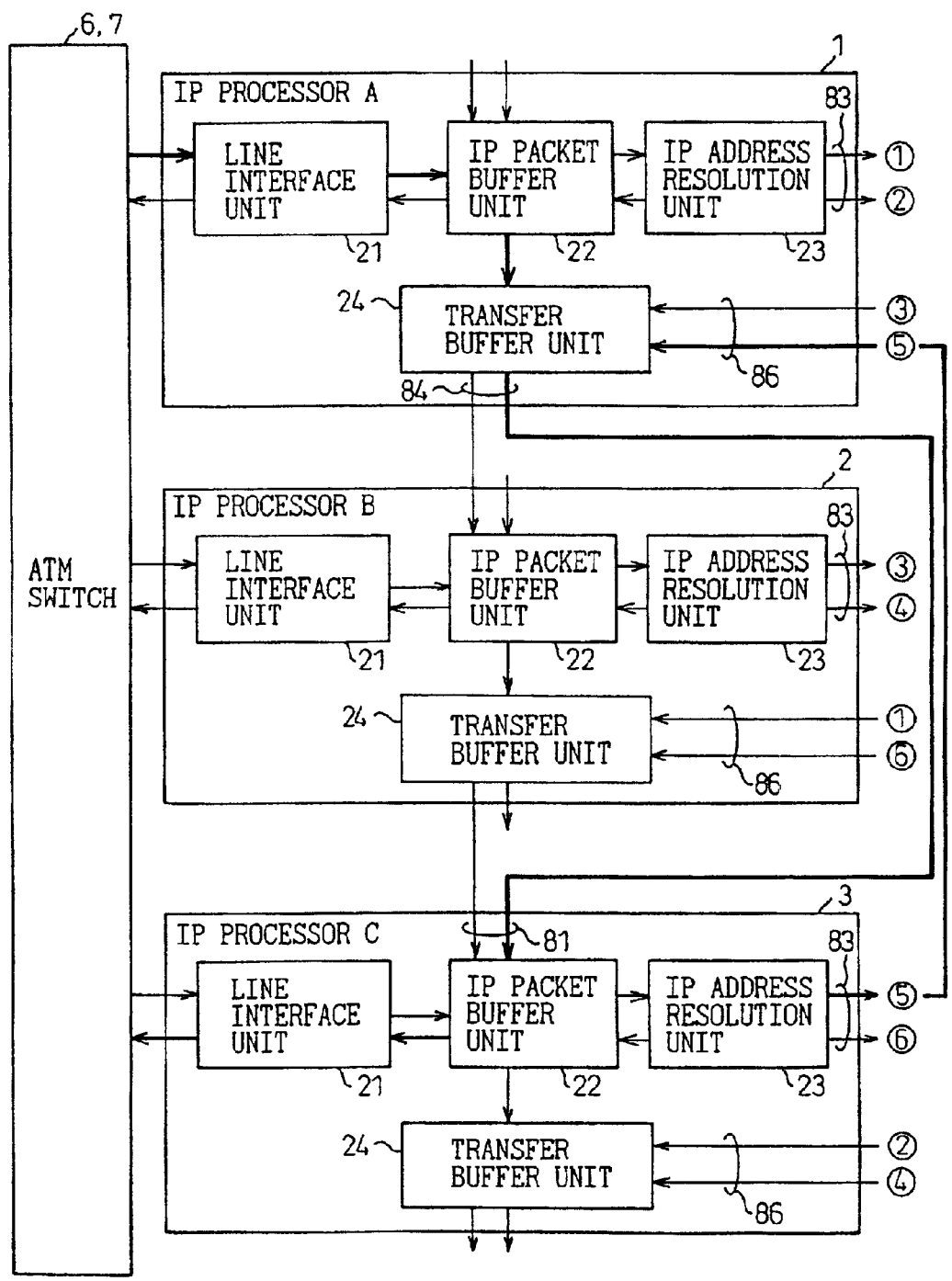
FIG. 10 is a view useful for explaining the operation of the third embodiment.

FIG. 10 is a view useful for explaining the operation of the third embodiment. In the figure, the numbers ① to ⑥ assigned to lines of each IP processor indicate that the lines with same number are respectively connected to each other. In FIG. 10, when the IP processor 1 receives an IP packet via the ATM switch 6 or 7 from a terminal (not shown), the IP packet is stored via the line interface unit 21 to the IP packet buffer unit 22. Then, the IP packet buffer unit 22 sends the destination address to the IP address resolution unit 23, and requests address resolution.

When a retrieval NG is returned from the IP address resolution unit 23, the IP packet buffer unit 22 does not execute VP/VC conversion, but transfers and stores the received IP packet as it is to the transfer buffer unit 24 as the IP packet with an unresolved address. In this example, when the IP processor 3 retrieves, through the IP address resolution unit 23, IP packets in the transfer buffer unit 24 of the IP processor 1, it detects said IP packet with an unresolved address, and determines that the address resolution is possible in the retrieving IP processor 3.

Accordingly, the IP packet with an unresolved address is sent from the IP processor 1 via the UTOPIA MULTI PHY interface to the IP processor 3, and the IP processor 3 that received the IP packet sends the IP packet to the ATM switch 6 or 7, after executing address resolution of the terminal under its control. Cases where the retrieving IP processor determines the possibility of address resolution of IP packets with an unresolved address in other IP processors may include, in addition to the case where the destination IP processor of the IP packet with an unresolved address is the same as the retrieving IP processor, cases where address resolution is otherwise possible in the retrieving IP processor. Thus, direct transfer between IP processors can be utilized to distribute the load of address information to be stored by each IP processor, and at the same time, to avoid the increase of traffic volume of the network that arises from execution of address resolution protocol.

Figure 11:
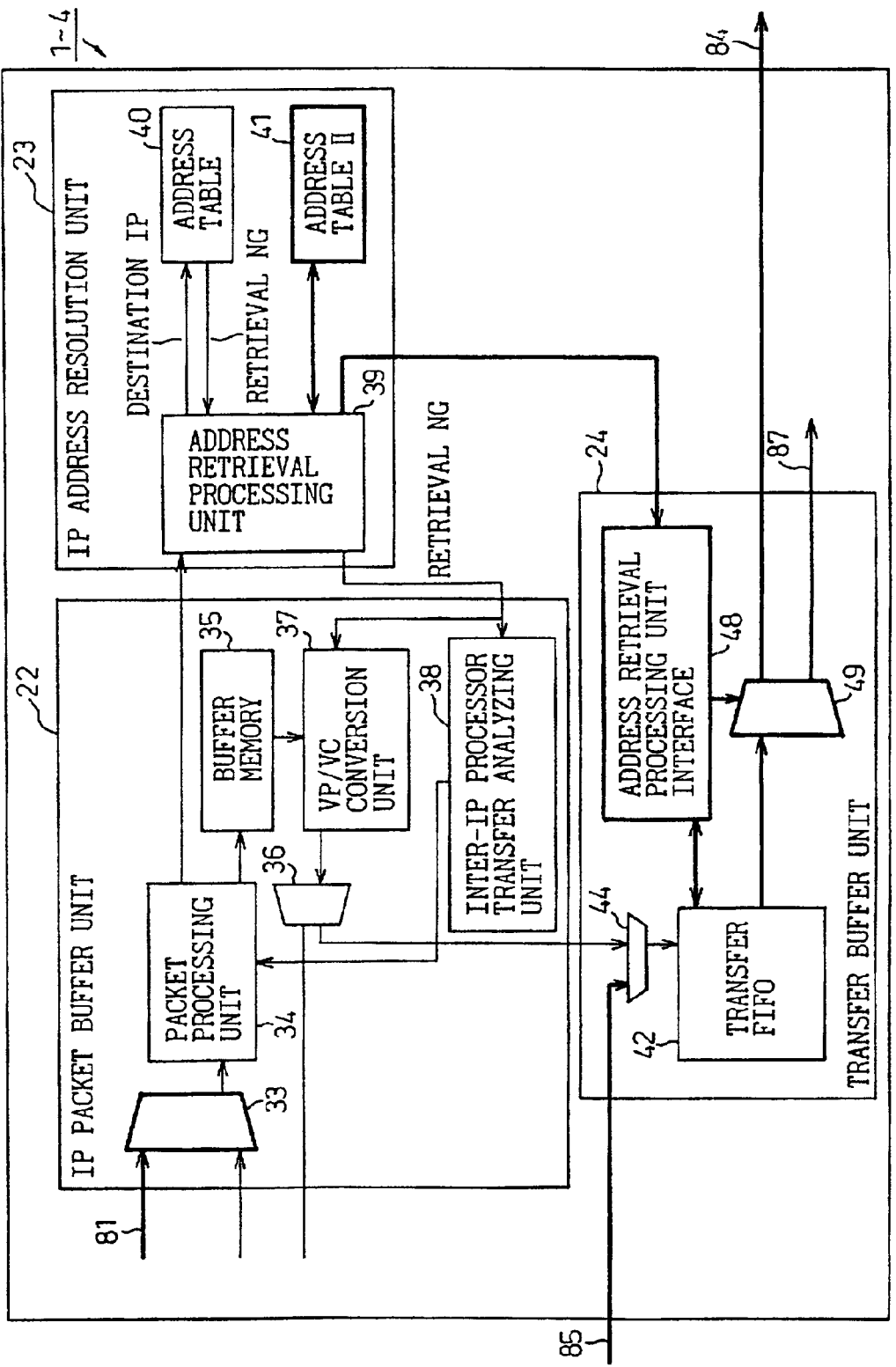
FIG. 11 is a view showing a fourth embodiment of the present invention.

FIG. 11 is a view showing a fourth embodiment of the present invention.

In the present embodiment, when an IP processor fails in address resolution of an IP packet, by means of direct transfer between adjoining IP processors, the IP packet can be transferred directly to the other adjoining IP processor so that the other IP processor can execute the address resolution protocol, in a manner different from the above described third embodiment. As shown in FIG. 11, an address table 41 is newly provided in the IP address resolution unit 23. In the transfer buffer unit 24, a new switch 49 is provided in addition to the same address retrieval processing unit interface 48 as in FIG. 9. A selector 33 is used in place of UTOPIA MULTI PHY interface in the IP packet buffer unit 22.

When the IP packet buffer unit 22 sends an address resolution request with a destination IP address to the IP address resolution unit 23, an address retrieval processing unit 39 of the IP address resolution unit 23 retrieves the address table 40. In this example, the address cannot be retrieved and a retrieval NG is returned to the IP packet buffer unit 22. As a result, NO CONVERSION (THROUGH) is set to the VP/VC conversion unit 37 of the IP packet buffer 22. Upon reception of the retrieval NG, the inter-IP processor transfer analyzing unit 38 sends an inter-IP processor transfer start request to the packet processing unit 34. On the other hand, if the retrieved result has been returned normally, an ordinary transfer start request is sent to the packet processing unit 34.

Upon reception of the inter-IP processor transfer start request due to the retrieval NG, the packet processing unit 34 switches the switch 36 to the transfer buffer unit 24, and outputs the IP packet in the buffer memory 35. In this case, the IP packet is transferred to the transfer buffer unit 24 as it is, without being subjected to the header conversion in the VP/VC conversion unit 37. So far, processing is the same as the third embodiment as described above. In the present embodiment, the address retrieval processing unit 39 of the IP address resolution unit 23 retrieves, utilizing empty processing time or the like, IP packets with unresolved addresses in the transfer buffer unit 24 via the address retrieval processing unit interface 48. If it detects an IP packet with an unresolved address, it retrieves the address table 41 based on the destination IP address, and determines whether the IP address should be resolved in its own IP processor or not.

FIG. 15 is a view showing an example of the address table 41. In this example, correspondence between the destination IP address and whether it is under the control of its own IP processor or not is stored. Based on the result of the retrieval of said address table 41, the IP address retrieval processing unit 39 outputs either processing request for its own IP processor or processing request for other IP processor to the address retrieval processing unit interface 48.

The address retrieval processing unit interface 48 switches the switch 49 to the line 87 in the former case, and to the line 84 in the latter case, and outputs the IP packet with unresolved address in the transfer FIFO unit 42. Inside the IP processor, the line 87 is directly connected to the input line 81 of the IP packet buffer unit 22, and the IP packet with unresolved address is stored in the buffer memory 35. On the other hand, when the switch 49 is switched to the line 84, the IP packet is transferred directly to the transfer buffer unit 24 of the next adjoining IP processor via the input line 85.

Figure 12:
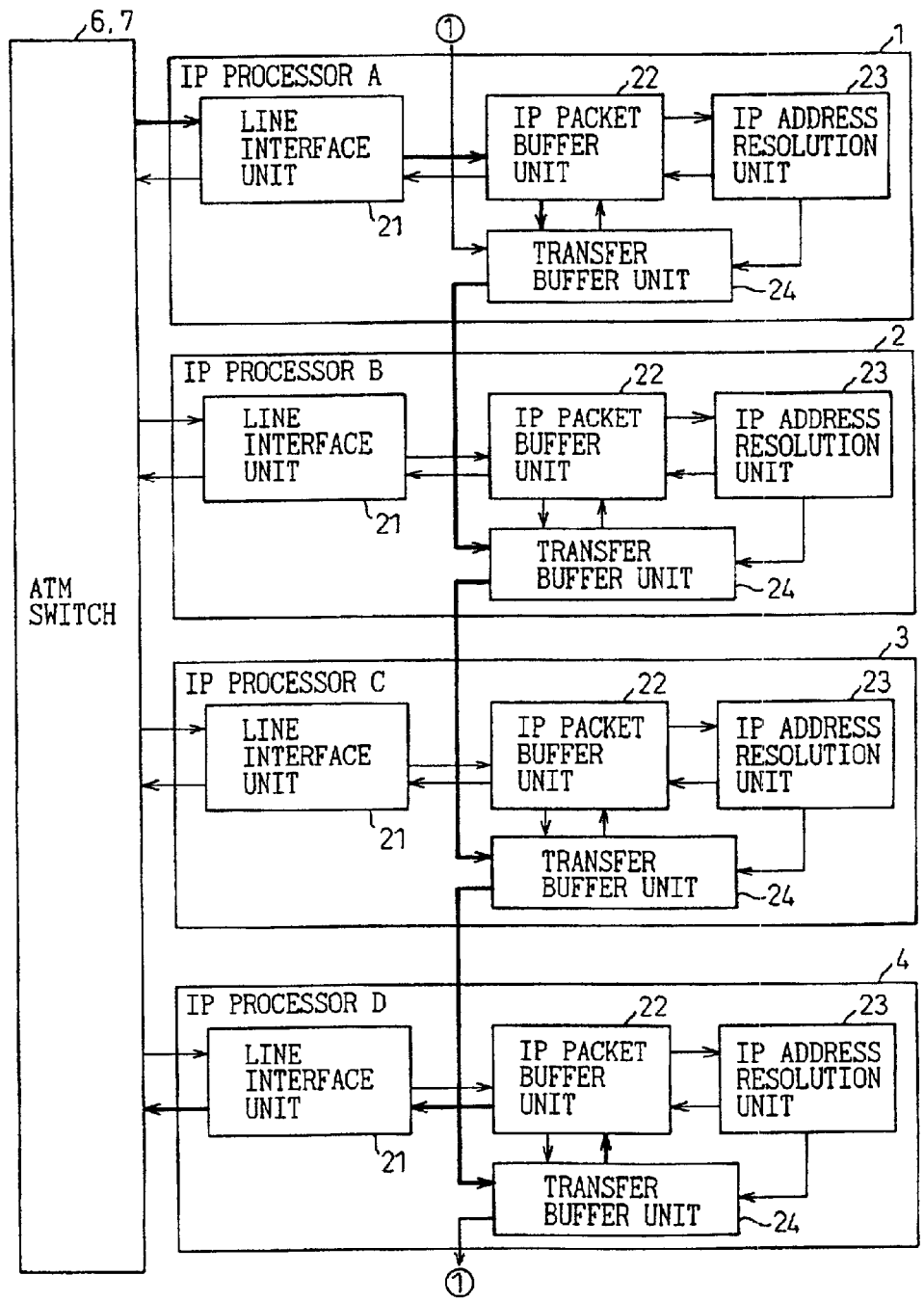
FIG. 12 is a view useful for explaining the operation of the fourth embodiment.

FIG. 12 is a view useful for explaining the operation of the fourth embodiment. In this figure, the same number ① assigned to lines in the IP processors 1 and 4 indicate that the lines are connected to each other. In FIG. 12, when the IP processor receives an IP packet via ATM switch 6 or 7 from a terminal (not shown), the received IP packet is stored via the line interface unit 21 to the IP packet buffer unit 22. Then, the IP packet buffer unit 22 sends the destination address to the IP address resolution unit 23 and requests address resolution.

When a retrieval NG is returned from the IP address resolution unit 23, the IP packet buffer unit 22 transfers and stores the received IP packet as it is, without executing VP/VC conversion, to the transfer buffer unit 24 as an IP packet with unresolved address. In the present embodiment, the IP address resolution unit 23 of the IP processor 1 detects, using empty processing time or the like, the IP packet in the transfer buffer unit 24, and determines, referring to said address table 41, that the IP packet is not to a destination under the control of its own IP processor (a retrieval NG has been returned), and sends it to the transfer buffer 24 of the next IP processor 2. Same determination is also made in the processor 2 and 3, and the IP packet with unresolved address is transferred successively to the IP processor 4.

The IP processor 4 determines, referring to the address table 41, that the IP packet with unresolved address is to a destination under its control, transfers the IP packet from the transfer buffer unit 24 to the IP packet buffer 22 via the internal connection lines 81, 87. The IP processor 4 executes address resolution protocol itself, and sends the IP packet to the ATM switch 6 or 7.

In the present embodiment, as in the third embodiment described before, distribution of the load of storing address information and avoidance of the increase of the network traffic are achieved by direct transfer between IP processors. In addition, the number of wires between IP processors can be reduced compared to the second embodiment. In the above-mentioned address table 41, a check flag may be provided to avoid same address determination in order to avoid occurrence of an infinite loop between IP processors.

The table information may include, for example, whether it is in the domain to be processed by its own IP processor or not, whether the destination IP address is within the range for which address resolution is to be requested from its own IP processor to the default IP processor on the side of IP network, or the like. In these cases, in order to process the IP packet with unresolved address, either the address resolution is requested to a specified IP processor or the like via the IP network, or the IP packet is transferred to the next adjoining IP processor.

Figure 16:
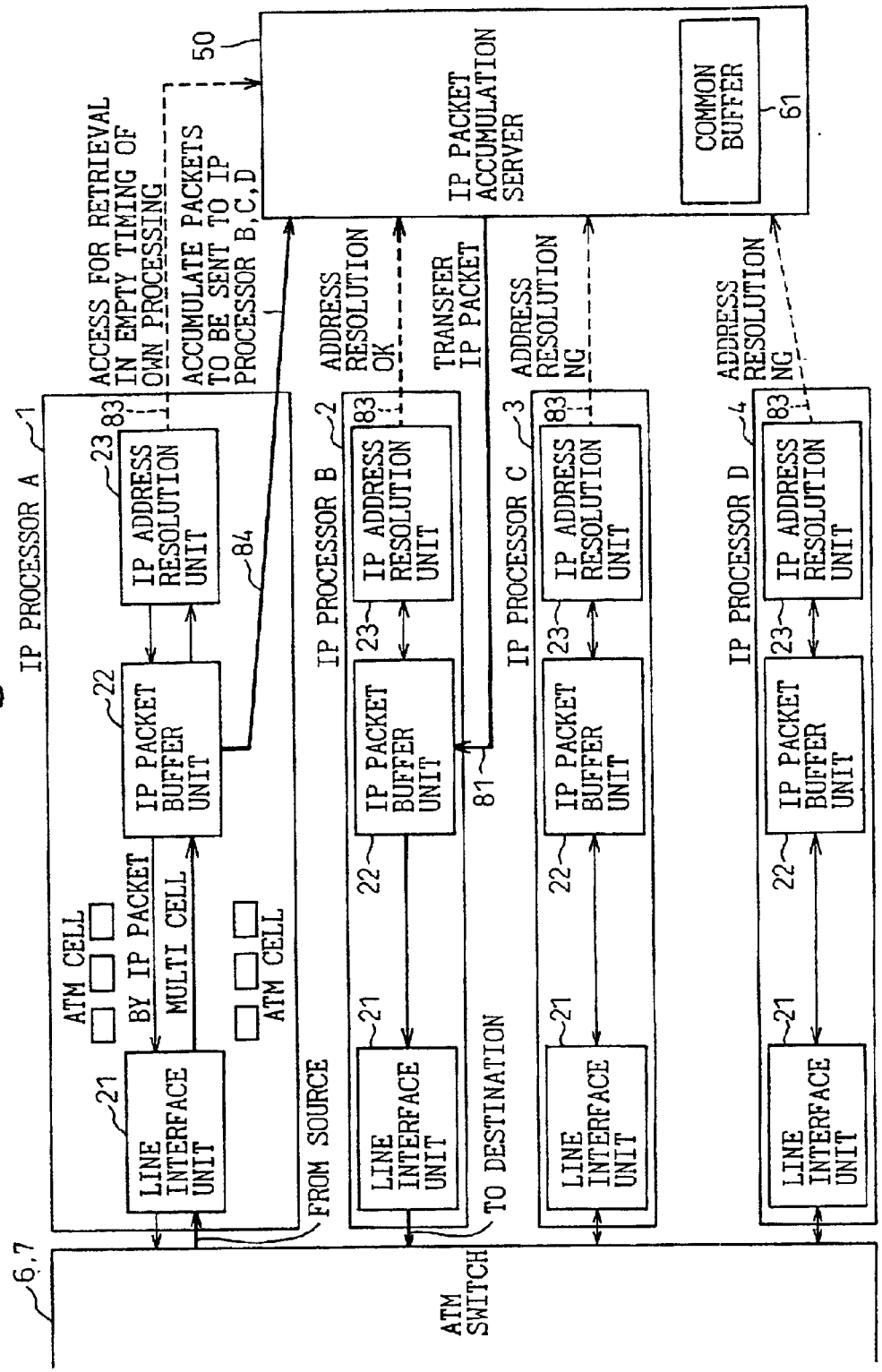
FIG. 16 is a view showing a fifth embodiment of the present invention.
Figure 17:
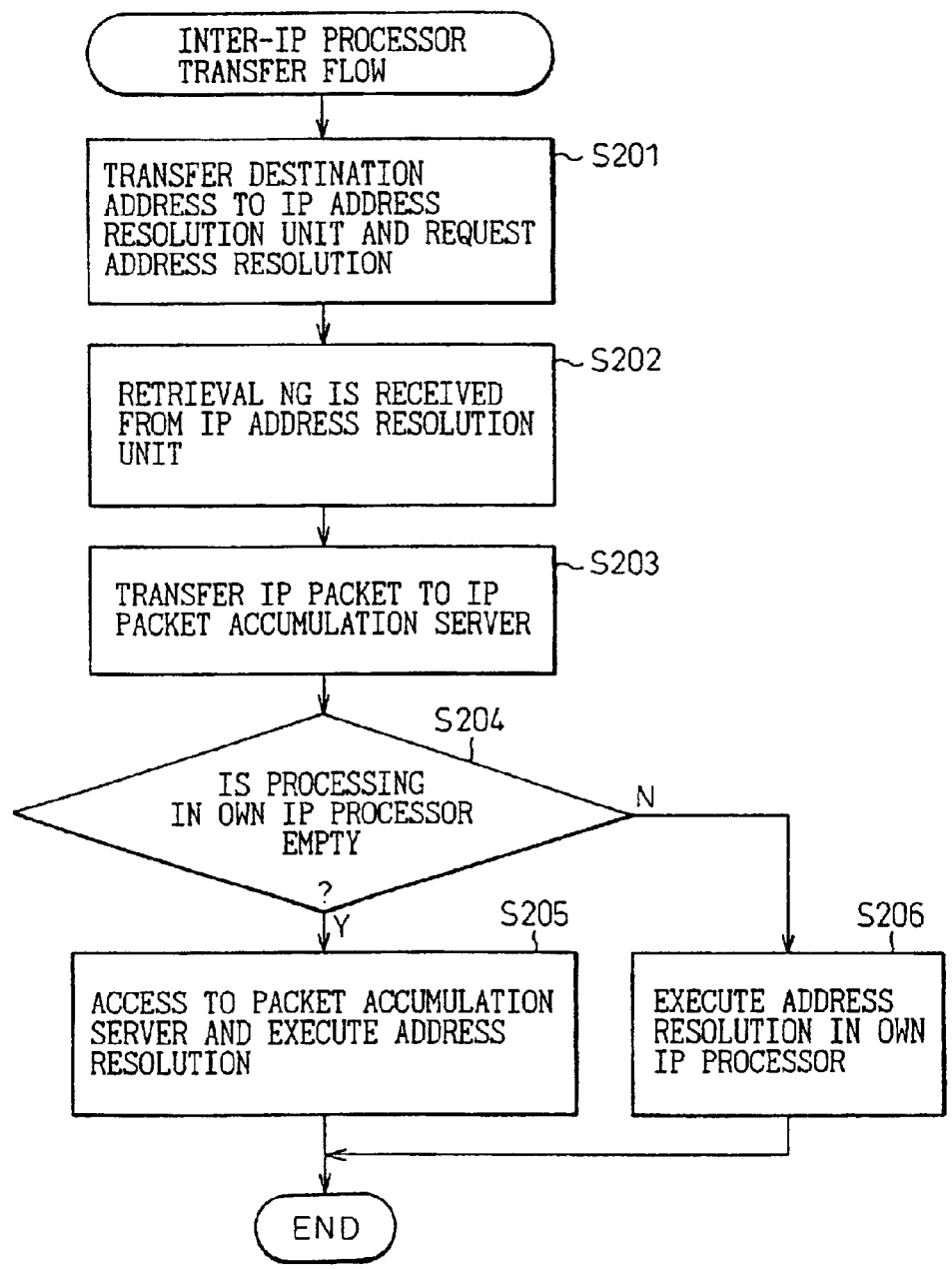
FIG. 17 is a view showing an exemplary control flow of FIG. 16.

FIG. 16 is a view showing a fifth embodiment of the present invention. FIG. 17 is a view showing an exemplary control flow of FIG. 16.

In this embodiment, an IP packet accumulating server 50 for externally accumulating IP packets with unresolved addresses is newly provided, and each of the IP processors 1 to 4 executes retrieval for address resolution. This eliminates the need for providing the transfer buffer unit 24 in each IP processor as in the first to fourth embodiments as has been described before. This permits the basic construction of the present invention shown in FIG. 3 to be applied so that the functions of the IP processor can be simplified. At the same time, distribution of address information to be stored over the IP processors 1 to 4 can be achieved.

In FIGS. 16, 17 (and in FIG. 3), when a retrieval NG is returned to the address resolution request from the IP packet buffer unit 22 to the IP address resolution unit 23 (S201 and 202), NO CONVERSION (THROUGH) is set to the VP/VC conversion unit 37 of the IP packet buffer unit 22 as in the third and fourth embodiments. Upon reception of the retrieval NG, the inter-IP processor transfer analyzing unit 38 sends an inter-IP processor transfer start request to the packet processing unit 34. On the other hand, when retrieved result is returned normally, it sends an ordinary transfer start request.

Upon reception of the inter-IP processor transfer start request that arises from the retrieval NG, the packet processing unit 34 switches the switch 36 to the IP packet accumulation server 50, and outputs the IP packet in the buffer memory 35 (S203). The above-mentioned IP packet is not subjected to the header conversion in VP/VC conversion unit 37, and is transferred, as it is, to the common buffer 61 in the IP packet accumulation server 50. The address retrieval processing unit 39 of the IP address resolution unit 23 in each of the IP processor 1 to 4 retrieves, utilizing empty processing time, IP packets with unresolved addresses which are stored in the common buffer 61 of the IP packet accumulation server 50.

In this example, the IP processor 2 detects an IP packet with address that can be resolved by its own IP processor, and after executing address resolution protocol, takes it into the packet buffer unit 22 (S204 and 205). For example, when the IP address resolution unit 23 determines that address resolution is possible in its own IP processor 2, it notifies the determination to the IP packet accumulation server 50. The IP packet accumulation server 50 sends an IP packet transfer request to the IP packet buffer unit 22 of the IP processor 2. Then, the IP packet buffer unit 22 outputs, in the timing of its empty processing time, instruction for the IP packet accumulation server 50 to output the IP packet, and takes in the IP packet into its own buffer 35. After executing VP/VC address conversion, it sends out the IP packet to the ATM switch 6 or 7.

Figure 18:
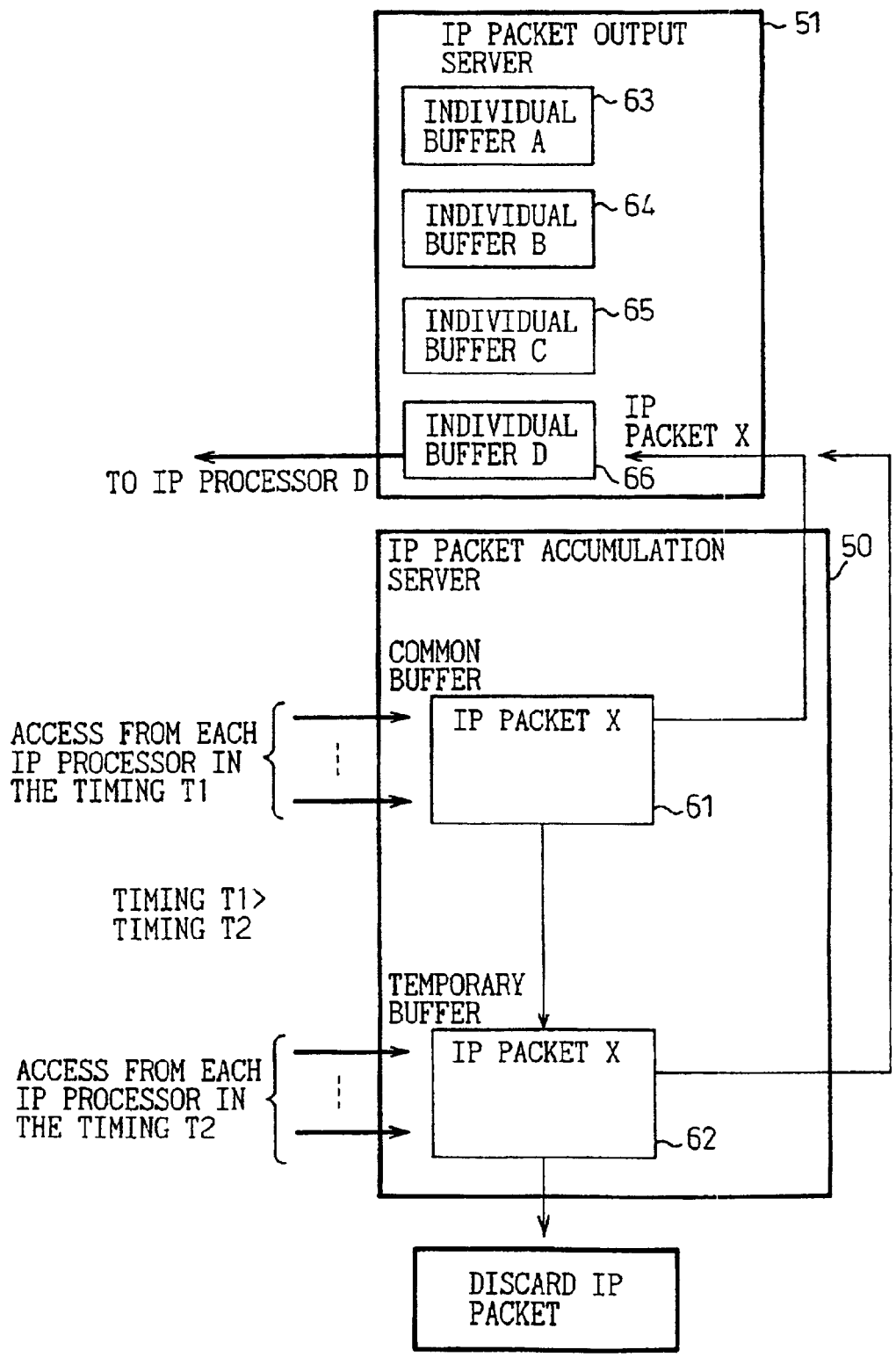
FIG. 18 is a view showing a sixth embodiment of the present invention.
Figure 19:
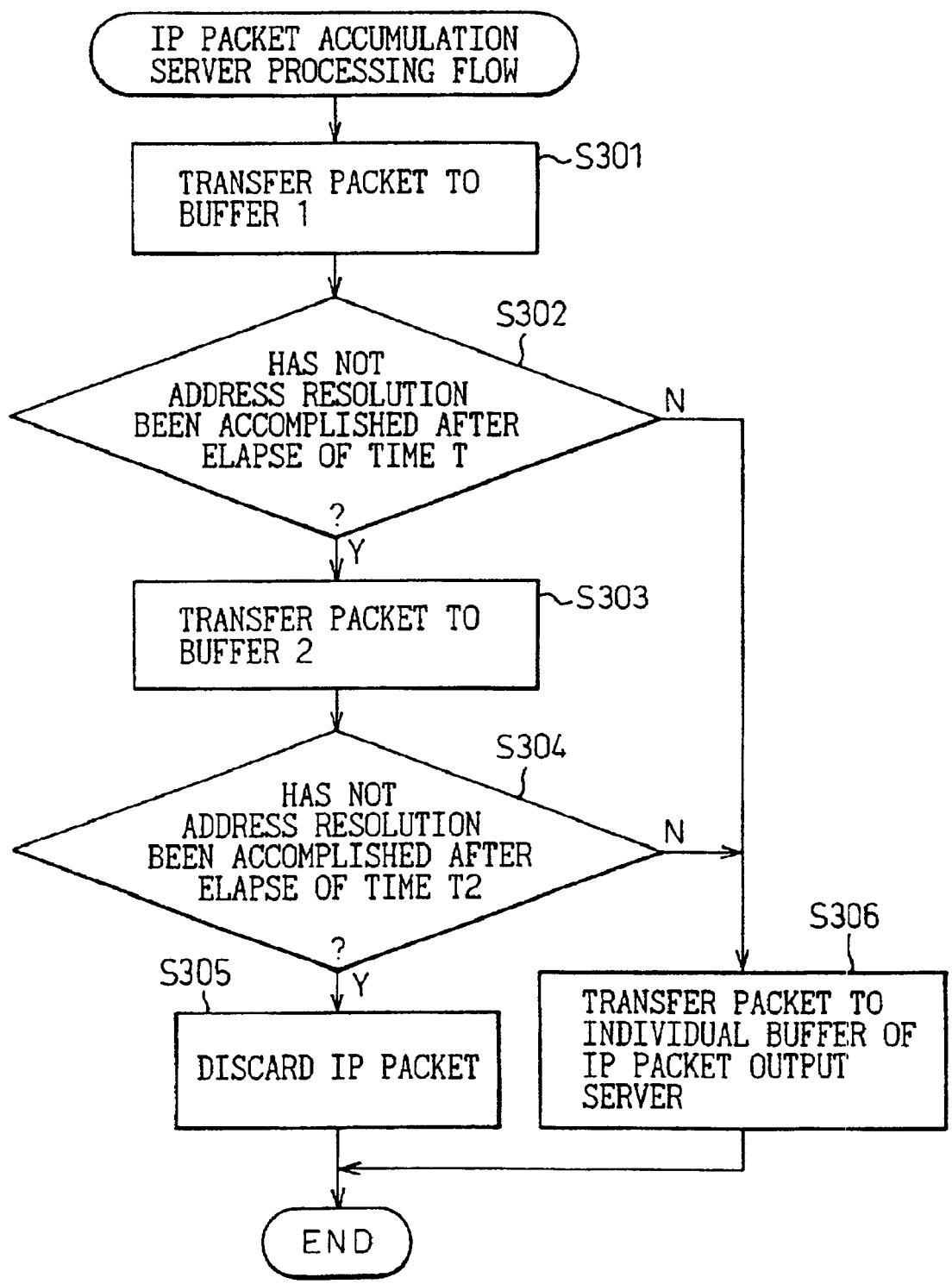
FIG. 19 is a view showing an exemplary control flow of FIG. 18.

FIG. 18 is a view showing a sixth embodiment of the present invention. FIG. 19 is a view showing an exemplary control flow of FIG. 18.

In the present embodiment, in addition to the IP packet accumulation server 50, an output server 51 is provided. As shown in FIG. 18, the IP packet accumulation server is comprised of two buffers, a common buffer 61 and a temporary buffer 62, and the IP packet output server 51 is comprised of individual buffers 63 to 66 in one-to-one correspondence with the IP processor 1 to 4.

Following advantages are obtained by providing the IP packet output server 51. That is, the IP packet X with unknown destination stored in the common buffer 61 of the IP packet accumulation server 50 can be transferred, as soon as address resolution has been executed in the same manner as described in the fifth embodiment, to the corresponding one of individual buffers 63 to 66 in the IP packet output server 51. In this example, address resolution is executed by the IP processor 4 and the IP packet is transferred to the corresponding individual buffer 66.

Thus, the IP packet buffer unit 22 of each of the IP processors 1 to 4 needs only to check, in the timing of its empty processing time, corresponding one of the individual buffers 63 to 66, so that if an IP packet is stored in the individual buffer it can at once, in the timing of empty time of the IP packet buffer unit 22, take in the IP packet and transfer it to the destination terminal.

As a result, the IP packet accumulation server 50 need not, after address resolution, send a transfer request to the destination IP packet unit 22 as described in the fifth embodiment. The IP packet accumulation server 50 needs only to transfer the IP packet to the applicable one of the individual buffers 63 to 66. In addition, the IP packet buffer unit 22 of each of the IP processors 1 to 4 needs only to check, using empty processing time, a corresponding one of the individual buffers 63 to 66, and can transfer the IP packet as soon as its existence is confirmed. In this manner, congestion of the buffer in the IP packet accumulation server 50 due to the delay of packet output from the IP packet accumulation server 50 by the timing of processing in the IP packet buffer 22 can be avoided.

As shown in FIGS. 18 and 19, in this embodiment, a common buffer 61 for initially storing the IP packet with unresolved address that is transferred from the IP packet buffer unit 22 of the IP processors 1 to 4, and a temporary buffer 62 for temporarily storing the IP packet for which address resolution has not been achieved in the common buffer, are provided in the IP packet accumulation server 50. Operation of the IP packet accumulation server 50 in this embodiment is as described below.

First, the IP packet X with unresolved address from each of the IP processors 1 to 4 is accumulated in the common buffer 61 of the IP packet accumulation server 50 (S301). The IP address resolution unit 23 of each of the IP processors 1 to 4 accesses to the common buffer 61, using empty processing time, and attempts address resolution of the IP packet X. The IP packet accumulation server 50 transfers the IP packet for which the address has been resolved to the applicable one of the individual buffers 63 to 66 of the IP packet output server 51 (S302 and S306).

The IP packet X with address remaining unresolved after a predetermined time period T1 is transferred to the next temporary buffer 62 to give another opportunity for address resolution before discarding it (S302 and S303). The IP packet accumulation server 50 transfers the IP packet X with address resolved within a predetermined time period T2 (T2<T1) to the applicable one of the individual buffers 63 to 66 (S304 and S306), and discards the IP packet X with address still unresolved (S304 and S305).

The IP address resolution unit 23 of each of the IP processors 1 to 4 accesses to the IP packet accumulation server 50 in an indefinite timing, and it is possible that there is no access even after a certain time period T has elapsed. The temporary buffer 62 is provided for the relief of such a situation. By setting each of the IP processors 1 to 4 such that access frequency to the common buffer 61 is high or access time interval is short and that access frequency to the temporary buffer 62 is low or access time interval is long, access congestion in the common buffer 61 can be avoided and, at the same time, discarding of the IP packets can be prevented. Although the construction using two stages is employed in the present embodiment, there is no special restriction on the number of stages.

Figure 20:
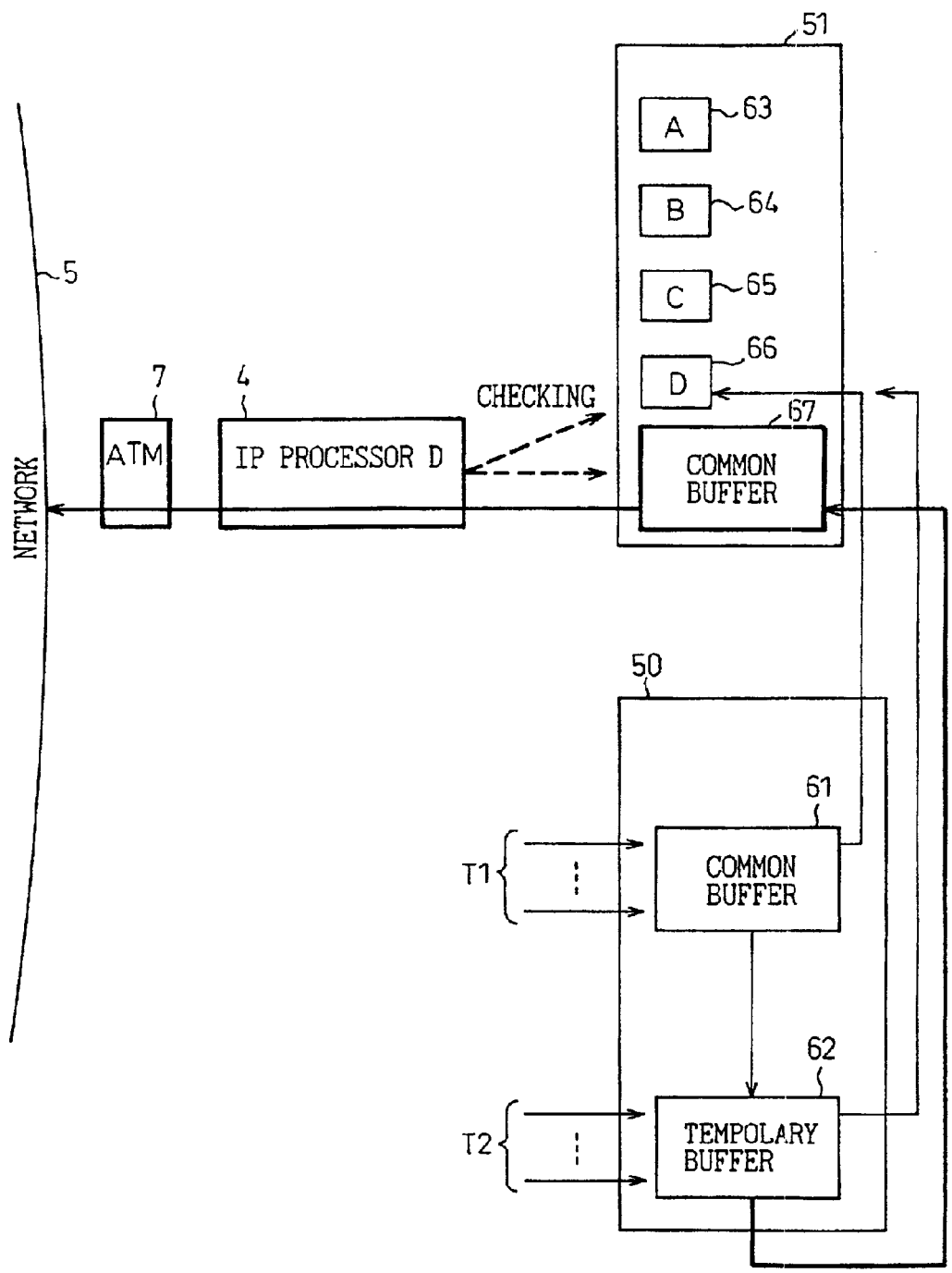
FIG. 20 is a view showing a seventh embodiment of the present invention.
Figure 21:
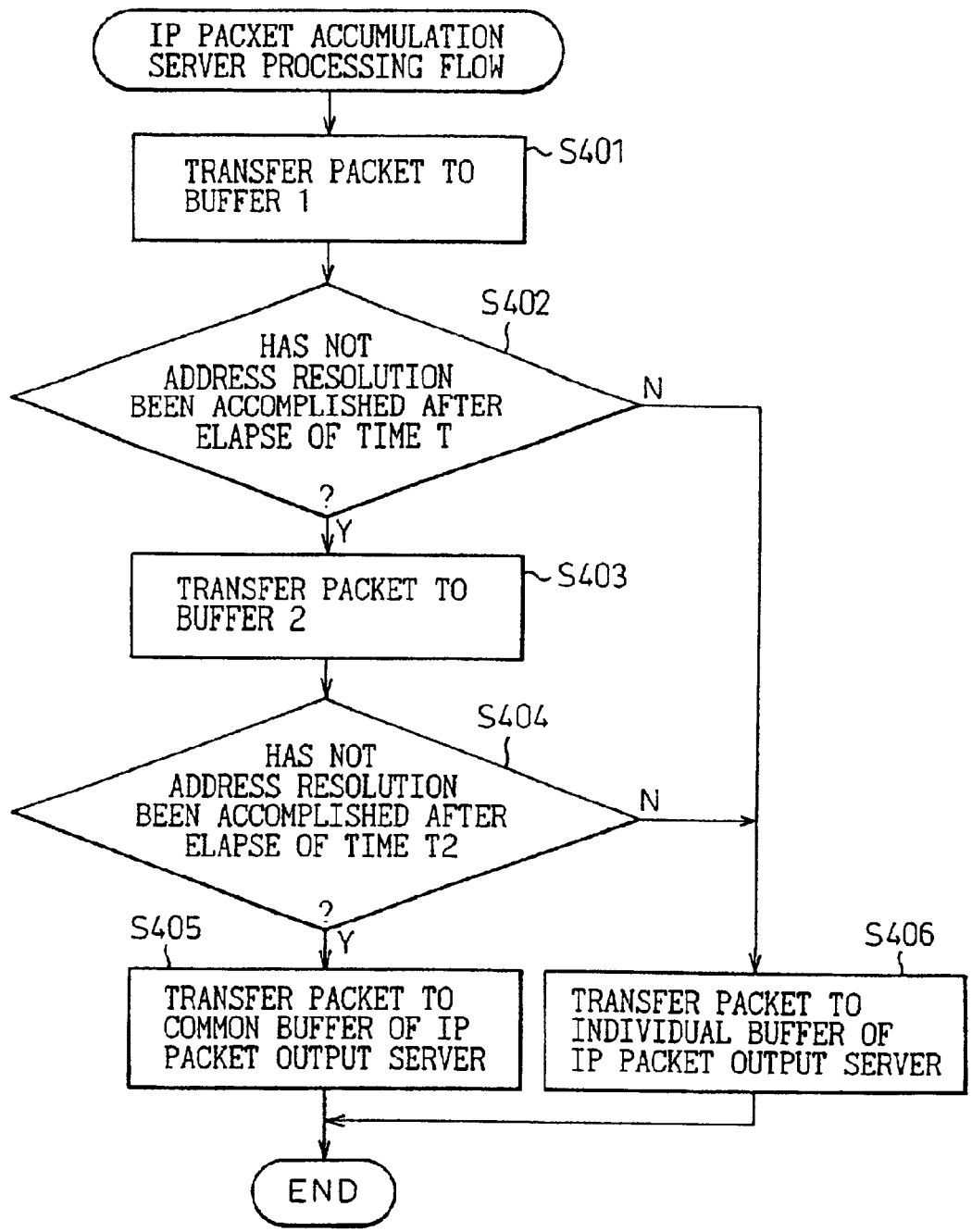
FIG. 21 is a view showing an exemplary control flow of FIG. 20.

FIG. 20 is a view showing a seventh embodiment of the present invention. FIG. 21 is a view showing an exemplary control flow of FIG. 20.

In this embodiment, a common buffer 67 that is accessible from predetermined IP processor is provided in the IP packet output server 51. As is evident from the control flow shown in FIG. 21, operation of the IP packet accumulation server 50 is generally the same as in the sixth embodiment, and only differs in processing after elapse of time period T2 (S405). Therefore, only the difference from the sixth embodiment will be described in the following.

As shown by step S405 in FIG. 21, the IP packet that would have been discarded in the sixth embodiment is, in this embodiment, further transferred to the common buffer 67 in the IP packet output server 51. Only a predetermined one of the IP processors 1 to 4, for example the IP processor 4 in FIG. 20, can access the above-mentioned common buffer 67. The IP processor 4 accesses, in addition to its individual buffer 66 as described in the sixth embodiment, the common buffer 67 in different access timing.

Upon detection of an IP packet there, the IP processor 4 transfers it at once via the switch 7 and the IP network to another IP processor connected to a predetermined path, and requests address resolution. The above-mentioned predetermined path is a path fixedly connected to another group of IP processors to which the IP processor 4 is not directly connected in the present invention. With this construction, address resolution by another group of IP processors can be expected and discarding of IP packets can be avoided further.

Figure 22:
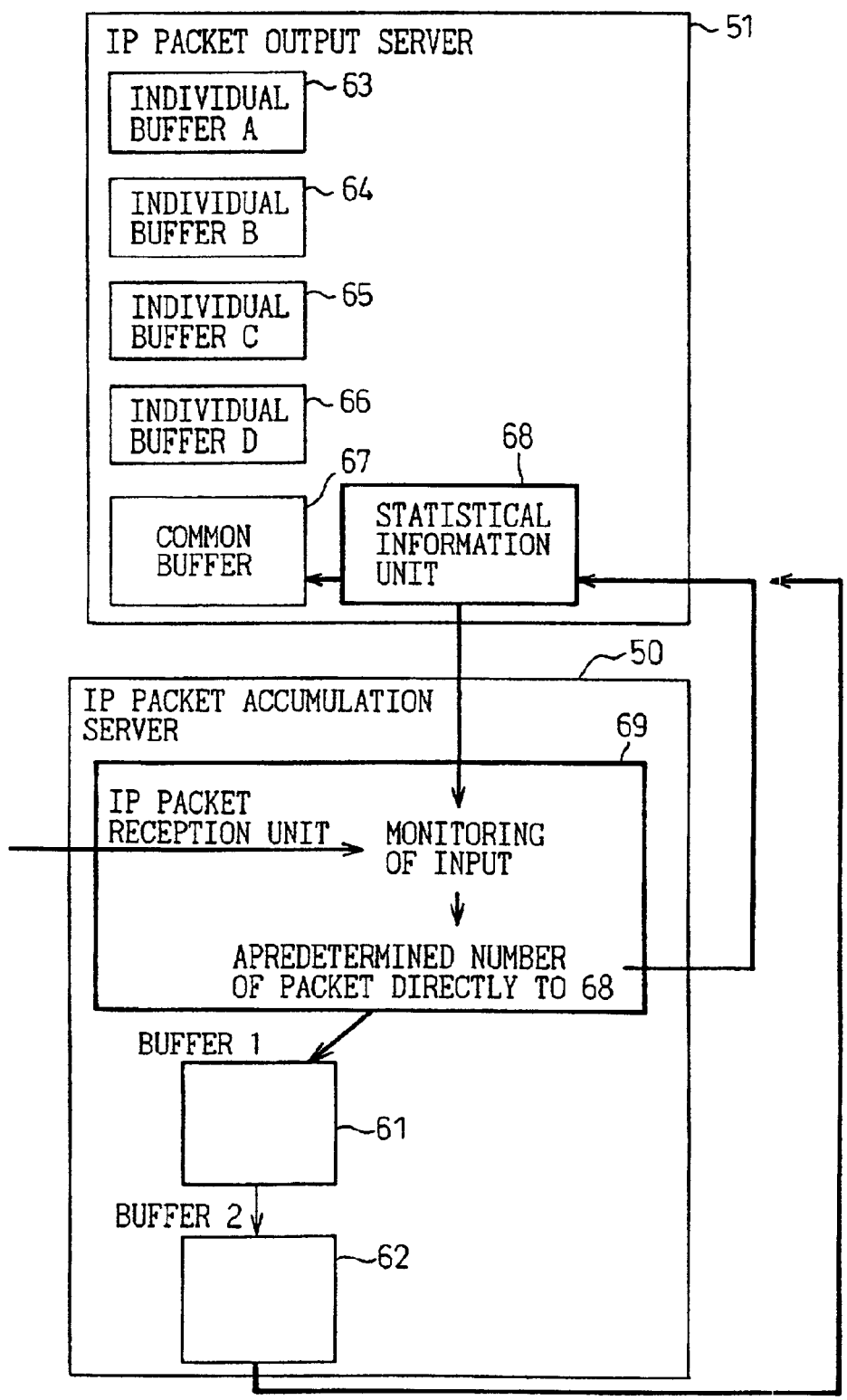
FIG. 22 is a view showing a eighth embodiment of the present invention.
Figure 23:
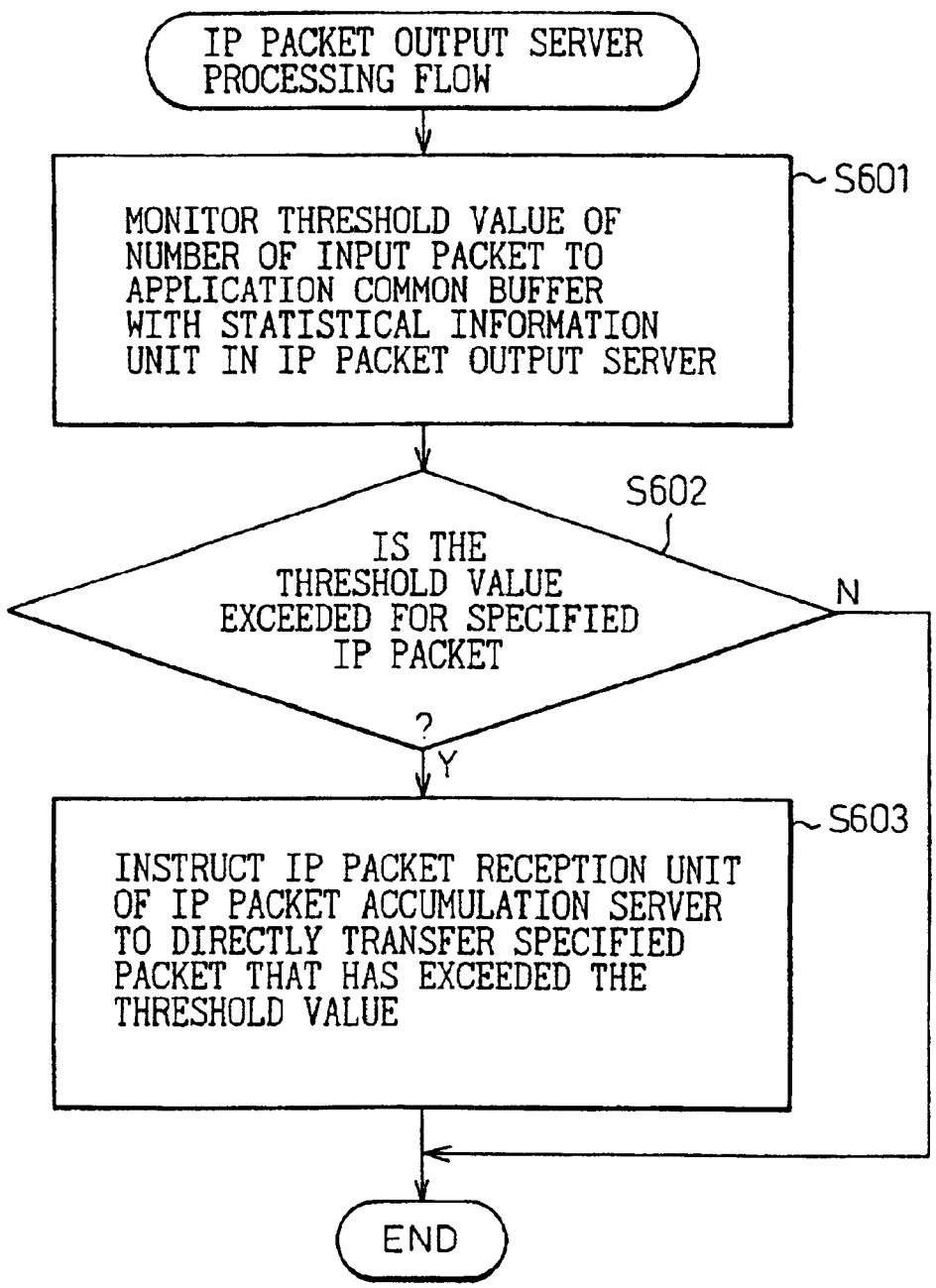
FIG. 23 is a view showing an exemplary control flow of FIG. 22.

FIG. 22 is a view showing a eighth embodiment of the present invention. FIG. 23 is a view showing an exemplary control flow of FIG. 22.

In this embodiment, in addition to the above-mentioned common buffer 67, a statistical information unit 68 for counting the number of packets by destination address for input IP packets is provided in the IP packet output server 51. Here, an IP packet reception unit 69 in the IP packet accumulation server 50 is also shown in relation to the operation of the statistical information unit 68.

As shown in FIG. 22, the statistical information unit 68 collects statistics of the number of packets by destination IP address for the IP packets with unresolved address which are input to the common buffer 67 of the IP packet output server 51 (S601). When the number of IP packets having same destination address exceeds a predetermined threshold value N, direct transfer of the IP packets is notified to the IP packet accumulation server 50 (S602 and S603). Upon receiving the notice, the IP packet accumulation server 50 continuously monitors the IP packet having the same destination IP address from among IP packets received from the IP processors 1 to 4, and transfers the corresponding IP packet directly to the common buffer 67 of the IP packet output server 51 without transferring it to the common buffer 61 in the IP packet accumulation server 50.

By thus specifying the IP packet with an unresolved address by a predetermined method, and when such a packet is received, by transferring it directly to the common buffer 67 of the IP packet output server 51 for transmitting it at once to other group of IP processors, rapid and efficient address resolution can be achieved. At the same time, access congestion of the common buffer 61 and the temporary buffer 62 of the IP packet accumulation server 50 can be avoided.

Figure 24:
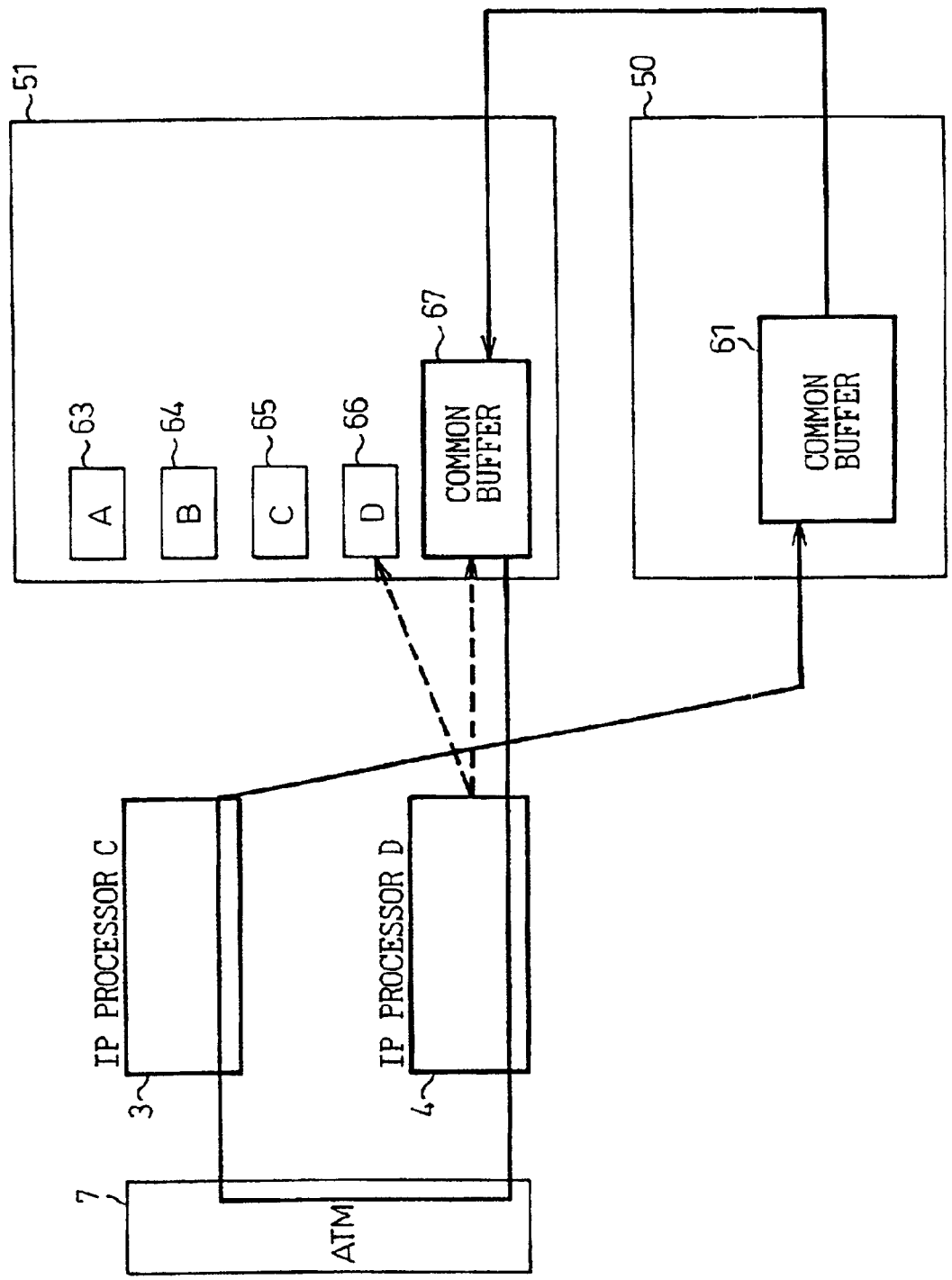
FIG. 24 is a view showing an ninth embodiment of the present invention.
Figure 25:
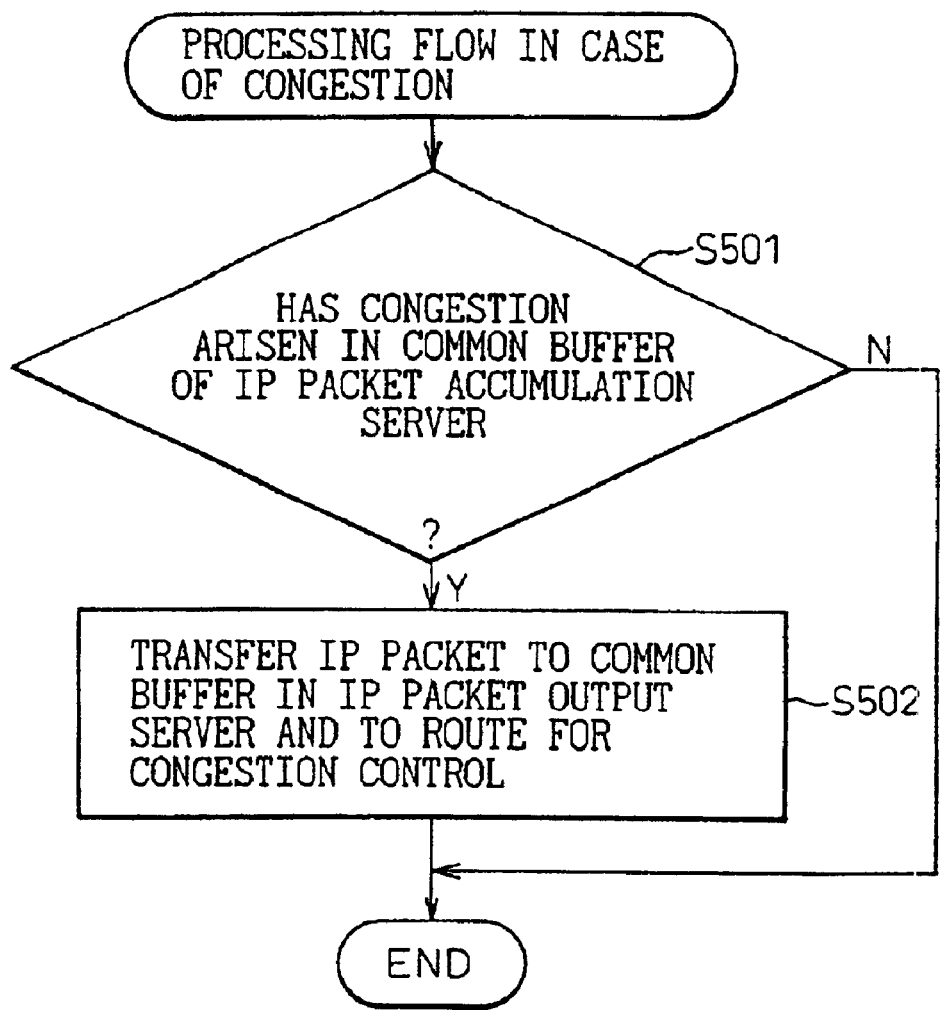
FIG. 25 is a view showing an exemplary control flow of FIG. 24.

FIG. 24 is a view showing an ninth embodiment of the present invention. FIG. 25 is a view showing an exemplary control flow of FIG. 24.

Here, a more simplified construction of the foregoing embodiments is shown as an example, and only a common buffer 67 is provided in addition to the individual buffers 63 to 67 in the IP packet output server 51.

As shown in FIG. 25, in the present embodiment, when buffer congestion arises in the common buffer 61 in the IP packet accumulation server 50, the congesting IP packets are not discarded but are at once transferred to the common buffer 67 in the IP packet output server 51 (S501 and S502). As in the seventh embodiment, only a predetermined one of the IP processors 1 to 4, the IP processor 4 in the example of FIG. 24, can access to the common buffer 67. The IP processor 4 accesses, in addition to its individual buffer 66, to the common buffer 67 in a different access timing.

Upon detection of an IP packet there, the IP packet 4 transfers it at once, via the switch 7, to another predetermined adjoining IP processor, the IP processor 3 in the example of FIG. 24. The congesting packet is transferred through the IP processor 3 again to the IP packet accumulation server 50. In this manner, in the present embodiment, the congesting packet that arises in the IP packet accumulation server 50 is not discarded but is subjected to a looping process via specified adjoining IP processors 3 and 4 to wait for the resolution of the congestion. As a result, discarding of packets due to buffer congestion can be avoided without adding any special hardware or software processing.

Figure 26:
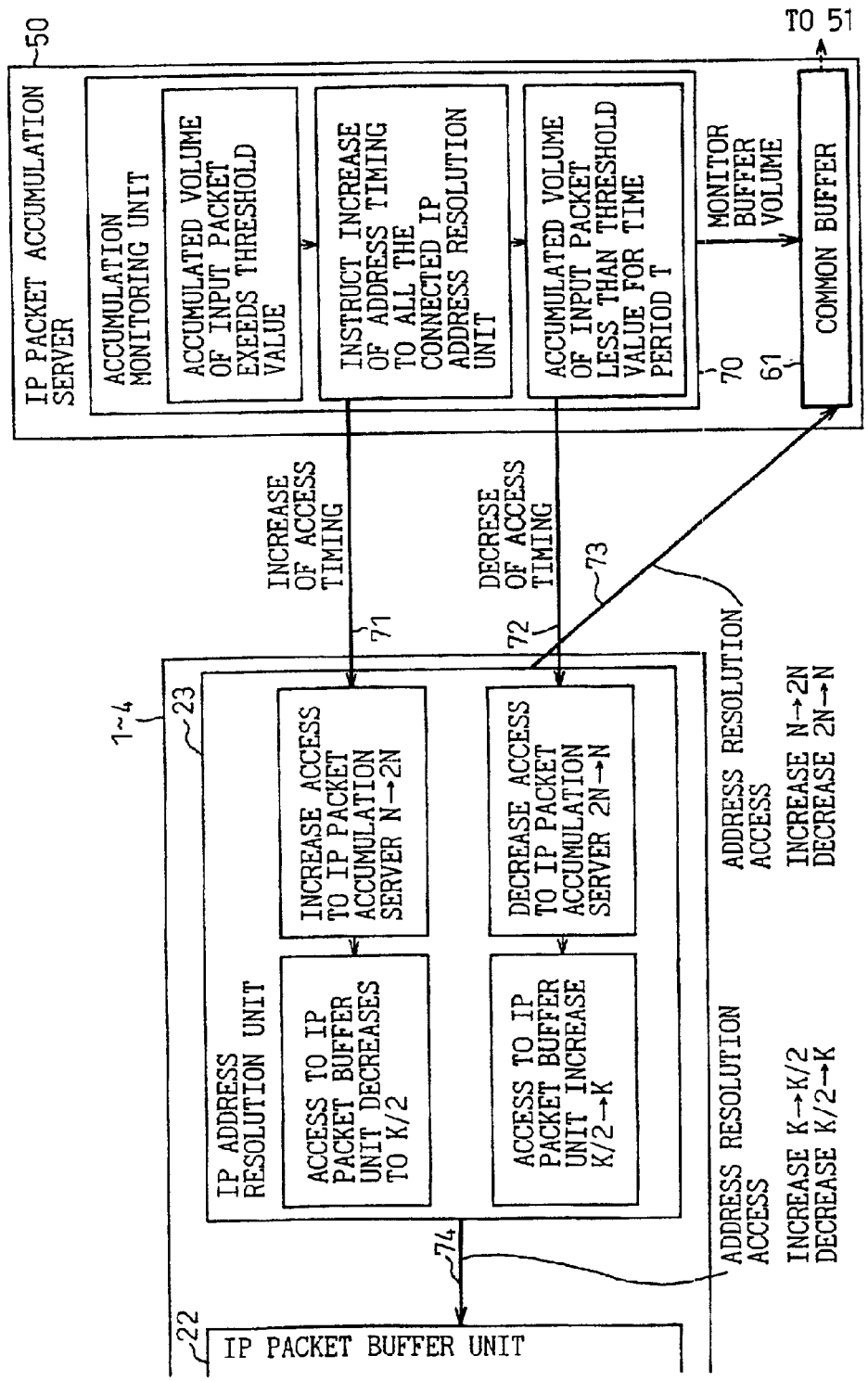
FIG. 26 is a view showing a tenth embodiment of the present invention.

FIG. 26 is a view showing a tenth embodiment of the present invention.

In this embodiment, an accumulation monitoring unit 70 for monitoring the buffer accumulation volume of the common buffer 61 is provided in the IP packet accumulation server 50. The accumulation monitoring unit 70 stores a predetermined threshold value that has been set to the accumulation monitoring unit, said threshold value being set with a margin for the occurrence of buffer congestion in the common buffer 61.

When the accumulation number of input IP packets exceeds the above-mentioned threshold value, the accumulation monitoring unit 70 gives instruction 71 to increase the access timing, that is, rapid address resolution of IP packets with unresolved addresses, to all the IP address resolution units 23 of the IP processors 1 to 4. Thereafter, when the accumulation number of the input IP packets falls short of said threshold value continuously for a predetermined time period, the accumulation monitoring unit 70 gives instruction 73 for decreasing the access timing, that is, address resolution of ordinary access timing, to all the IP address resolution units 23.

Upon receiving the instruction 71 for increasing the access timing, each IP address resolution unit 23 increases, in this embodiment, the access 73 to the IP packet accumulation server 50 per unit time from N to 2N. As a result, the access 74 between the IP address resolution unit 23 and the IP packet buffer unit 22 of its own processor decreases from K to K/2. Thereafter, upon receiving the instruction 72 for decreasing the access timing, the access 73 to the IP packet accumulation server 50 per unit time is decreased from 2N to N, and the access 74 between the IP address resolution unit 23 and the IP packet buffer unit 22 is increased from K/2 to K.

Although control operation in the case of buffer congestion is shown in this example, similar control operation as described above may be performed for the buffer in an ordinary condition by setting a predetermined threshold value, so that rapid and efficient address resolution protocol can be executed by each of the IP processors 1 to 4. Thus, according to the present embodiment, buffer congestion in the IP packet accumulation server 50 can be avoided in advance. As is evident from the example described above, the processing volume (access frequency) between the IP address resolution unit 23 and the opposing IP packet buffer unit 22 in own IP processor and that between the IP address resolution unit 23 and the external IP packet accumulation server 50 are in a definite relation to each other. Thus, according to this embodiment, depending on the accumulated volume of the IP packet accumulation server 50, whether the preference is to be given to the processing of the IP packet accumulation server 50 or to the IP packet buffer unit 22 may be controlled variably, so that resource can be effectively utilized.

Figure 27:
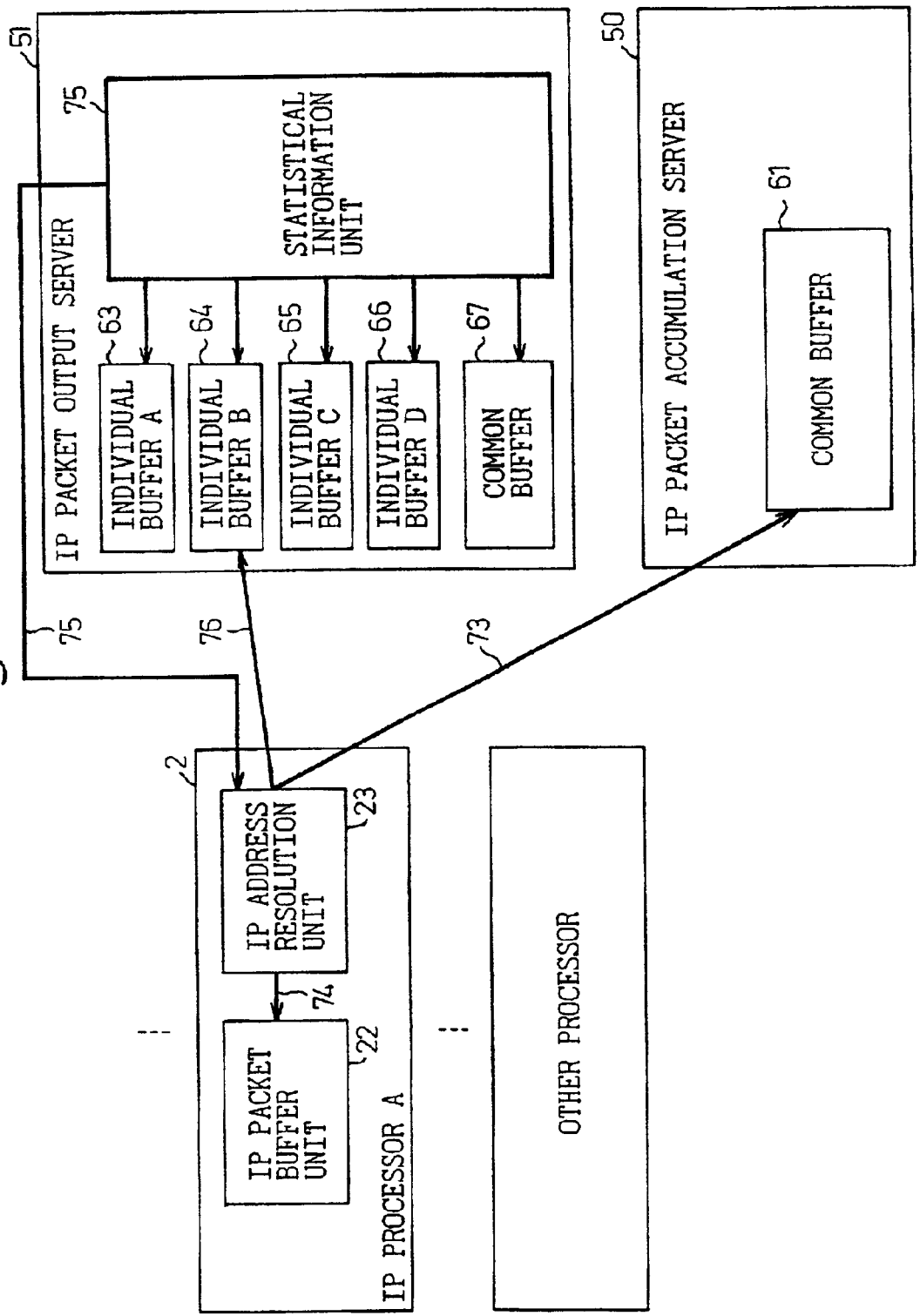
FIG. 27 is a view showing an eleventh embodiment of the present invention.
Figure 28:
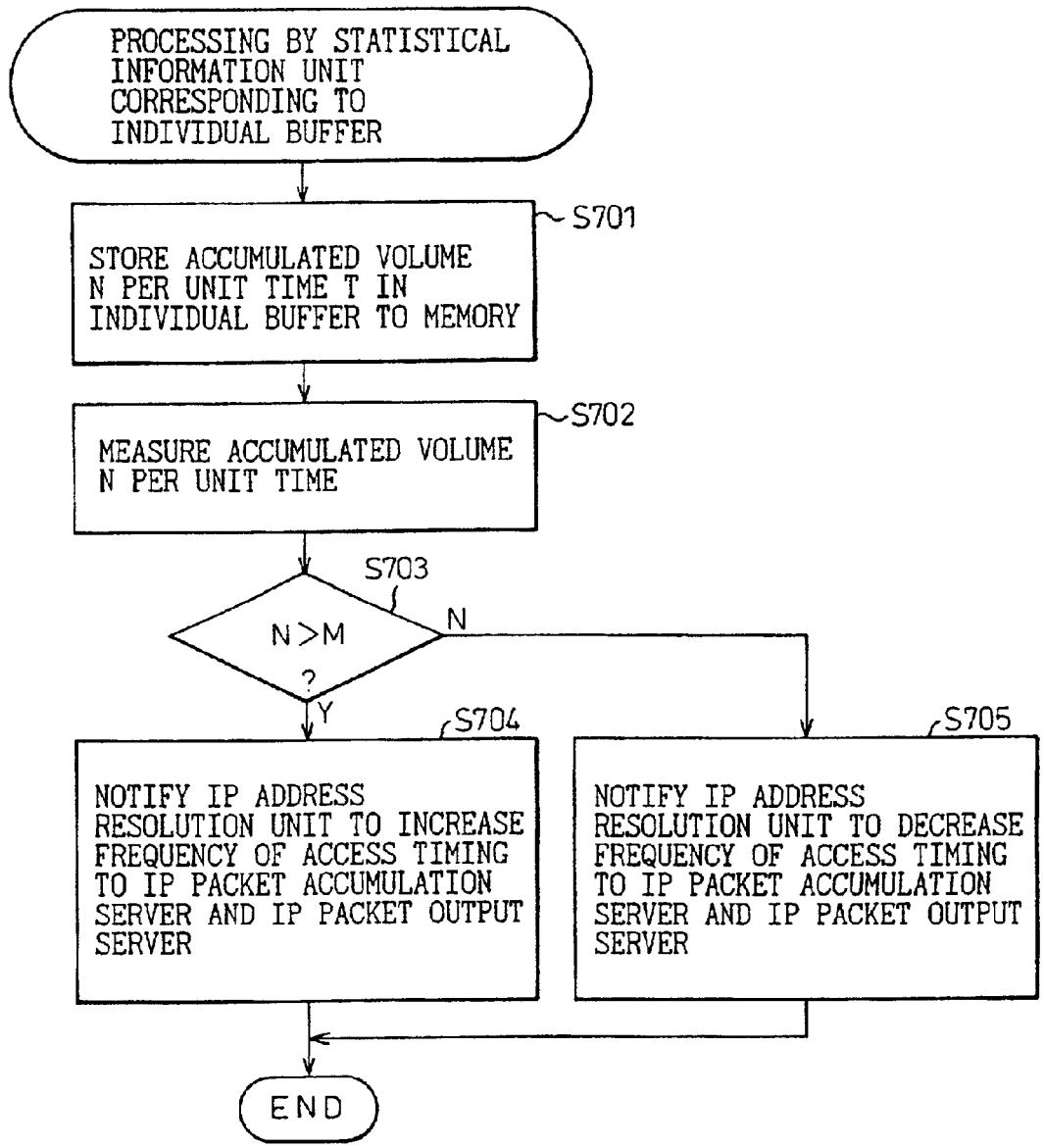
FIG. 28 is a view showing an exemplary control flow of FIG. 27.

FIG. 27 is a view showing an eleventh embodiment of the present invention. FIG. 28 is a view showing an exemplary control flow of FIG. 27.

In the foregoing tenth embodiment, control operation is performed based on the buffer accumulation volume of the common buffer 61 in the IP packet accumulation server 50. In contrast, in this embodiment, control operation is performed based on the buffer accumulation volume of each of the individual buffers 63 to 66 and/or the common buffer 67 in the IP packet output server 51. Therefore, a statistical information unit 75 for monitoring the buffer accumulation volume of each of the individual buffers 63 to 66 and/or the common buffer 67 is provided in the IP packet output server 51.

As shown in FIG. 28, the statistical information unit 75 stores the set packet accumulation volume M per unit time of the individual buffers 63 to 66 and common buffer 67 (S701), and measures actual packet accumulation volume N of each of the buffers 66 to 67 (S702). When N>M, in order to avoid the overflow of the individual buffers or the like, it gives instruction 75 for increasing the access timing, to the individual IP processor (the IP processor 2 in this example) corresponding to the individual buffer (the individual buffer 64 in this example) (S703 and S704).

Thereafter, when N<M, it gives instruction 75 for decreasing the access timing (S703 and S705). Operation of the IP processor 2 upon receiving the instruction is the same as in the tenth embodiment except that access 76 and 73 is made both to the common buffer 61 of the IP packet accumulation server 50 and to the corresponding individual buffer of the IP packet output server 51. Thus, in this embodiment, control is possible individually for each of the IP processors 1 to 4, and further, mediated by the IP address resolution unit 23, more dynamic control of the IP packet accumulation server 50, IP packet buffer 22, and the IP packet output server 51 becomes possible.

Figure 29:
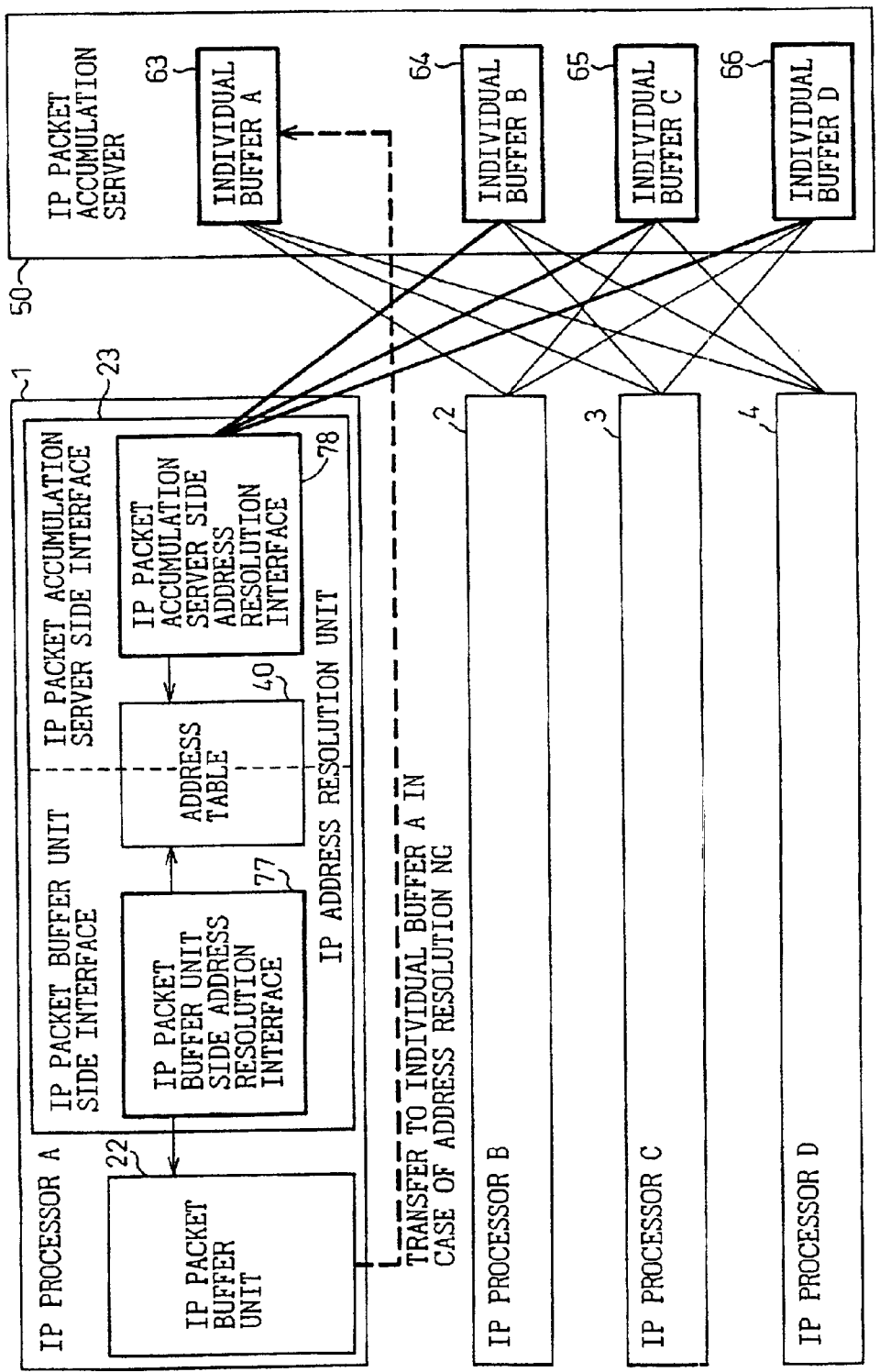
FIG. 29 is a view showing a twelfth embodiment of the present invention.

FIG. 29 is a view showing a twelfth embodiment of the present invention.

In this embodiment, the IP address resolution unit 23 is separated into an IP packet buffer unit side address resolution interface 77 that is specialized in address resolution on the side of the IP packet buffer unit 22, and to an IP packet accumulation server side interface 78 that is specialized in address resolution on the side of the IP packet accumulation server 50. Address resolution protocol can be executed more advantageously and more speedily by eliminating the association of the two operations and permitting both to operate in independent timing.

In this embodiment, the IP packet output server 51 is not used and individual buffers 63 to 66 corresponding to the IP processors 1 to 4 are provided in the IP packet accumulation server 50. Each of the IP processors 1 to 4 transfers an IP packet with unresolved address to its own individual buffer in the IP packet accumulation server 50, but executes address resolution of the IP packets accumulated in the IP packet accumulation server 50 only for the IP packets accumulated in the individual buffer other than its own individual buffer. In the example shown in FIG. 29, the IP processor 1 transfers its own IP packet with unresolved address to the individual buffer 63, and executes address resolution only for the IP packets accumulated in the individual buffers 64 to 66 other than its own individual buffer 63.

As described above, address resolution on the side of the IP packet buffer unit and address resolution on the side of IP packet accumulation server 50 are executed independently, and the output side of IP packets to the IP packet accumulation server 50 is separated from the input side of IP packet from the IP packet accumulation server 50, so that each can operate asynchronously without using the IP packet output server 51 and respective resource corresponding to each operation can be utilized utmost. Further, by separating the input side and the output side of IP packets, unnecessary operations, such as attempt by the IP processor to execute address resolution of the IP packet which it has transferred as a packet with unresolved address, can be avoided.

Figure 30:
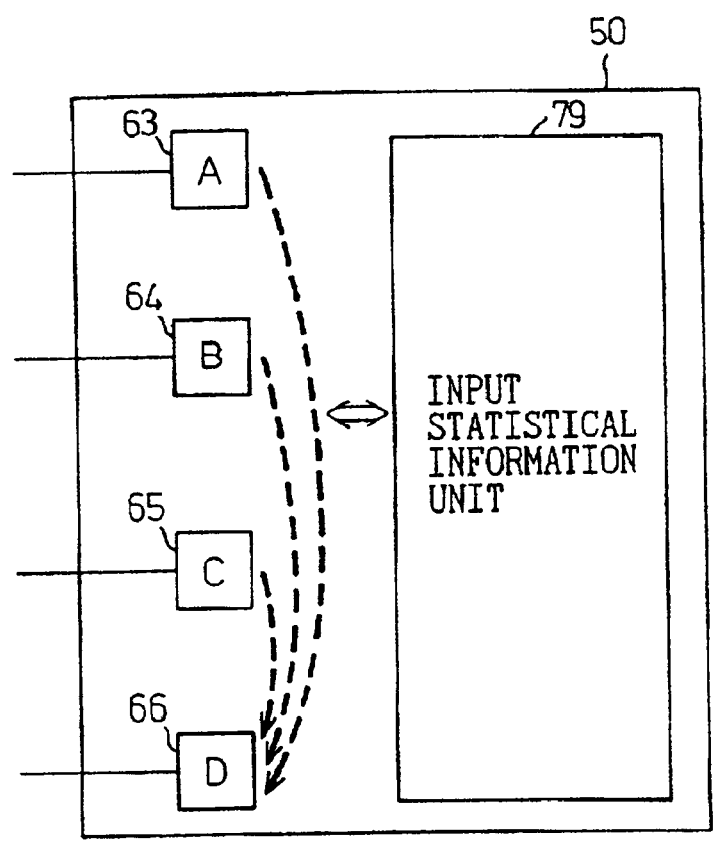
FIG. 30 is a view showing a thirteenth embodiment of the present invention.

FIG. 30 is a view showing a thirteenth embodiment of the present invention. FIG. 31 is a view showing an exemplary control flow of FIG. 30.

In this embodiment, an input statistical information unit 79 is provided for continuously monitoring and measuring the number of input packets input to each of the individual buffers 63 to 66 in the IP packet accumulation server 50. This is analogous to the statistical information unit 75 in the eleventh embodiment as described above, but in this embodiment, the input statistical information unit 79 further dynamically modifies the buffer resource allocated to each of the individual buffers 63 to 66 based on the information obtained by the measurement.

In the example of FIG. 30, the input statistical information unit 79 counts the number of packets input to each of the individual buffers 63 to 66 in accumulation period t, and thence obtains ratio of the number of input packets between the individual buffers (S801). If, for example, the ratio is 1:1:1:2 in the order of the individual buffers 63 to 66, the input statistical information unit 79 allocates a part of the empty resource of the individual buffers 63 to 65 to the individual buffer 66 that is short of buffer resource (S802 and S803).

As a result, the ratio of the resource that can be utilized by each of the individual buffers is always maintained substantially to 1:1:1:1. Thus, even when there is deviation in the input number of IP packets, the empty buffer can be effectively utilized so that buffer congestion in the IP packet accumulation server 50 may be avoided. It is evident that similar control can be performed on the side of the IP packet output server 51.

FIG. 32 is a view showing a fourteenth embodiment of the present invention. FIG. 33 is a view showing an exemplary control flow of FIG. 32.

As an example, operation of the present embodiment is as follows. When buffer congestion arises in the IP packet buffer unit 22 of the IP processor 1, the IP packet is not discarded but transferred to the individual buffer 64, 65 or the like other than the individual buffer 63 corresponding to the IP processor 1 in the IP packet accumulation server 50 (S901). The own individual buffer 63 is excluded so that the IP processor 1 may not later access to it for address resolution as explained in the twelfth embodiment. In the present embodiment, the IP processor 1 further selects the individual buffer so as to make ratio of the resource of the individual buffers equal or nearly equal as described in the thirteenth embodiment.

The IP processor 1 later accesses to the individual buffer 64, 65 or the like to which it has transferred IP packets, and executes address resolution protocol of the IP packets with unresolved addresses (S902). Thus, in this embodiment, the IP packet accumulation server 50 is utilized in order to avoid buffer congestion that may arise in the IP processors 1 to 4. Discarding of IP packets can be thus avoided, and the IP processors 1 to 4 can continue packet transfer while avoiding the occurrence of congestion. This holds true also for the transfer between adjoining IP processors.

As described above, according to the present invention, a plurality of adjoining IP processors connected to ATM switches are connected to each other via a transfer buffer unit so that IP packets can be directly sent and received from one IP processor to the other IP processor without being mediated by ATM switches or the IP packet network. As a result, load on ATM switches and IP packet networks is significantly reduced, and at the same time, high speed and large volume transfer of IP packets on the network becomes possible. When a future increase of the demand for Internet communication and the need for high speed and large volume transfer of information are taken into account, the significance of the present invention in its contribution to the provision of a stable IP network is very great.

What is claimed is:

1. An IP processor provided for ATM switches connected to an IP network, said IP processor comprising:

a line interface unit for interfacing with said ATM switch;

an IP packet buffer unit for storing an IP packet from said line interface unit, and sending out the IP packet after address resolution to said line interface unit; and an IP address resolution unit that responds to address resolution request from said IP packet buffer unit, and returns the destination address information after address resolution;

wherein said IP packet buffer unit includes an inter-IP processor transfer analyzing unit and an IP processor table, and further sends out, when the inter-IP processor transfer analyzing unit determines the destination IP processor based on information obtained from the IP processor table, said stored IP packet to the destination IP processor via a direct connection line fixedly routed between a plurality of IP processors without mediation by said IP network and ATM switches.

2. An IP processor, according to claim 1, further comprising a transfer buffer unit for storing the IP packet from said IP packet buffer unit, wherein an input of said transfer buffer unit is connected to said direct transfer route and an output of said transfer buffer unit is connected to an input of the IP packet buffer unit of said IP processor, or to an input of an IP packet buffer unit and/or an input of a transfer buffer unit of another of the plurality of IP processors.

3. An IP processor, according to claim 2, wherein said IP address resolution unit includes an address retrieval processing unit that retrieves a table based on the destination IP address appended to said address resolution request, and returns a destination address and an IP processor number or a retrieval NG as said destination address information, and wherein said IP packet buffer unit includes an inter-IP processor transfer analyzing unit that retrieves a table based on said IP processor number to confirm the existence of said other IP processor and transfers the IP packet with appended information confirming the existence of the IP processor to said transfer buffer unit, and wherein said transfer buffer unit includes a transfer memory that stores said IP packet with appended information and outputs the stored IP packet based on said appended information to the corresponding IP processor.

4. An IP processor, according to claim 3, wherein said transfer buffer unit comprises a table storing the IP processor numbers of said plurality of IP processors, and outputs the IP packet to the IP packet buffer unit of said other IP processor when the IP processing number in said table for said other IP processor coincides with said appended information.

5. An IP processor, according to claim 3, wherein said transfer buffer unit comprises means for storing the IP processor number of any one of said IP processors, and outputs the IP packet, when the stored IP processor number coincides with said appended information, to the IP packet buffer unit of the IP processor with the same number, and when the stored IP processor number does not coincide with said appended information, to the transfer buffer unit of the IP processor with the same number.

6. An IP processor, according to claim 3, wherein said address resolution unit, upon detection of retrieval NG, retrieves IP packets in the transfer buffer unit of said other IP processor, and upon detection of an IP packet for which address resolution is possible as a result of this retrieval, causes said transfer buffer unit to output the IP packet to the IP packet buffer unit of said IP processor.

7. An IP processor, according to claim 3, wherein said IP address resolution unit comprises a table showing whether processing in said IP processor is possible or not corresponding to the destination IP address, and upon detection of retrieval NG, retrieves the IP packet in the transfer buffer unit of said IP processor using said table, and causes said transfer unit to output the IP packet to the IP packet buffer unit of said IP processor when processing of the IP packet is determined to be possible, and when processing of the IP packet is determined to be impossible, to the transfer buffer unit of a predetermined IP processor in said plurality of IP other than said IP processor.

8. An IP processor, according to claim 1, further comprising an IP packet accumulation server for accumulating IP packets from said IP packet buffer unit, with its input being connected to said direct transfer route and its output being connected to the input of said IP packet buffer unit, wherein said IP address resolution unit executes address resolution of IP packets accumulated in said IP packet accumulation server.

9. An IP processor provided for ATM switches connected to an IP network, said IP processor comprising:
   a line interface unit for interfacing with said ATM switch;
   an IP packet buffer unit for storing an IP packet from said line interface unit, and sending out the IP packet after address resolution to said line interface unit;
   an IP address resolution unit that responds to address resolution request from said IP packet buffer unit, and returns the destination address information after address resolution; and
   an IP packet accumulation server for accumulating IP packets from said IP packet buffer unit, with its input being connected to said direct transfer route and its output being connected to the input of said IP packet buffer unit, wherein said IP address resolution unit executes address resolution of IP packets accumulated in said IP packet accumulation server;
   wherein said IP packet buffer unit further includes inter-IP processor transfer unit which sends out, when the destination address information cannot be retrieved from said IP address resolution unit, said stored IP packet to a direct transfer route for transfer between a plurality of IP processors without mediation by said IP network and ATM switches; and
   wherein said IP packet accumulation server comprises a first common buffer for accumulating IP packets from said plurality of IP processors, and said IP address resolution unit individually accesses said first common buffer to execute address resolution of the applicable IP packet.

10. An IP processor provided for ATM switches connected to an IP network, said IP processor comprising:
    a line interface unit for interfacing with said ATM switch;
    an IP packet buffer unit for storing an IP packet from said line interface unit, and sending out the IP packet after address resolution to said line interface unit;
    an IP address resolution unit that responds to address resolution request from said IP packet buffer unit, and returns the destination address information after address resolution; and
    an IP packet accumulation server for accumulating IP packets from said IP packet buffer unit, with its input being connected to said direct transfer route and its output being connected to the input of said IP packet buffer unit, wherein said IP address resolution unit executes address resolution of IP packets accumulated in said IP packet accumulation server;
    wherein said IP packet buffer unit further includes inter-IP processor transfer unit which sends out, when the destination address information cannot be retrieved from said IP address resolution unit, said stored IP packet to a direct transfer route for transfer between a plurality of IP processors without mediation by said IP network and ATM switches; and
    wherein said IP packet accumulation server comprises a temporary buffer in addition to said first common buffer, and transfers the IP packets in said first common buffer for which address resolution has not been accomplished within a first predetermined time period to said temporary buffer, and discards the IP packet in said temporary buffer for which address resolution has not been accomplished within a second predetermined time period less than the first predetermined time period.

11. An IP processor, according to claim 10, further comprising an IP packet output server that includes individual buffers respectively corresponding to said plurality of IP processors with its output being connected to the input of said IP packet buffer unit, wherein the IP packet for which address resolution has been accomplished by said IP processor in said first common buffer and/or temporary buffer within said first or second predetermined time period is transferred to said individual buffer of the applicable IP processor, and thence to the IP packet buffer of said IP processor.

12. An IP processor, according to claim 11, wherein said IP packet output server further includes a second common buffer for accumulating the IP packets discarded by said IP packet accumulation server, and wherein only specified IP processor executes address resolution of the IP packet in said second common buffer via said ATM switches and IP packet network.

13. An IP processor, according to claim 12, wherein said IP packet output server further includes a first statistical information unit for monitoring the number of IP packets which are input to said second common buffer, said first statistical information unit instructing said IP packet accumulation server, when the number of specified IP packets exceeds a predetermined threshold value, to transfer said specified IP packet immediately after reception.

14. An IP processor, according to claim 13, wherein, when buffer congestion arises in said first common buffer, said IP packet accumulation server transfers a predetermined number of the IP packets from said first common buffer to said second common buffer of said IP packet output server, and wherein only a specified IP processor performs the relayed transfer of said IP packet via said ATM switch, first and second common buffers in order to avoid buffer congestion.

15. An IP processor, according to claim 9, wherein said IP packet accumulation server controls the flow of IP packets in accordance with the accumulated volume in said first common buffer for the address resolution unit of said IP processor, and wherein said IP address resolution unit increases or decreases access to said first common buffer in accordance with the control.

16. An IP processor, according to claim 11, wherein said IP packet output server comprises a second statistical information unit for individually monitoring the accumulated volume in said individual buffers, and wherein said second statistical information unit controls the flow of IP packets for the IP address resolution unit of each of said plurality of IP processors in accordance with the accumulated volume in the corresponding individual buffer, said IP address resolution unit increasing or decreasing access to said first common buffer and the corresponding individual buffer in accordance with the control.

17. An IP processor provided for ATM switches connected to an IP network, said IP processor comprising:

a line interface unit for interfacing with said ATM switch;

an IP packet buffer unit for storing an IP packet from said line interface unit, and sending out the IP packet after address resolution to said line interface unit;

an IP address resolution unit that responds to address resolution request from said IP packet buffer unit, and returns the destination address information after address resolution; and an IP packet accumulation server for accumulating IP packets from said IP packet buffer unit, with its input being connected to said direct transfer route and its output being connected to the input of said IP packet buffer unit, wherein said IP address resolution unit executes address resolution of IP packets accumulated in said IP packet accumulation server;

wherein said IP packet buffer unit further includes inter-IP processor transfer unit which sends out, when the destination address information cannot be retrieved from said IP address resolution unit, said stored IP packet to a direct transfer route for transfer between a plurality of IP processors without mediation by said IP network and ATM switches; and wherein said IP packet accumulation server comprises individual buffers corresponding to each of said plurality of IP processors, and wherein the IP packet buffer unit of each of said plurality of IP processors transfers an IP packet to the individual buffer corresponding to the IP processor and the IP address resolution unit executes address resolution of IP packets in the individual buffers for others of said plurality of IP processors.

18. An IP processor, according to claim 17, wherein said IP packet accumulation server comprises a first input statistical information unit for obtaining the ratio of an accumulated volume of IP packets in said individual buffers, and wherein said first input statistical information unit dynamically modifies the buffer size of each of the individual buffers so as to obtain a substantially uniform ratio of accumulated volume of IP packets in the individual buffers in relation to each other.

19. An IP processor, according to claim 17, wherein, when buffer congestion arises in the IP packet buffer unit of said IP processor, the IP packet buffer unit transfers a predetermined number of IP packets to an individual buffer for another of said plurality of IP processors, the IP address resolution unit executing the address resolution thereof.

* * * * *